(12) United States Patent
Yoneda et al.

(10) Patent No.: US 12,074,005 B2
(45) Date of Patent: Aug. 27, 2024

(54) PROTECTIVE ELEMENT

(71) Applicant: DEXERIALS CORPORATION, Tochigi (JP)

(72) Inventors: Yoshihiro Yoneda, Shimotsuke (JP); Koji Sato, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 560 days.

(21) Appl. No.: 17/310,985

(22) PCT Filed: Mar. 2, 2020

(86) PCT No.: PCT/JP2020/008651
§ 371 (c)(1),
(2) Date: Sep. 2, 2021

(87) PCT Pub. No.: WO2020/179728
PCT Pub. Date: Sep. 10, 2020

(65) Prior Publication Data
US 2022/0084773 A1 Mar. 17, 2022

(30) Foreign Application Priority Data
Mar. 5, 2019 (JP) .................... 2019-039888

(51) Int. Cl.
*H01H 37/76* (2006.01)
*H01H 85/00* (2006.01)
(Continued)

(52) U.S. Cl.
CPC ........ *H01H 85/36* (2013.01); *H01H 85/0047* (2013.01); *H01H 2037/762* (2013.01); *H01H 85/06* (2013.01); *H01H 85/08* (2013.01)

(58) Field of Classification Search
CPC ... H01H 37/761; H01H 2037/762–763; H01H 85/36; H01H 85/0047; H01H 85/06; H01H 85/08
See application file for complete search history.

(56) References Cited

U.S. PATENT DOCUMENTS

| 6,556,119 B1* | 4/2003 | Lell ...................... H01H 37/323 337/182 |
| 2001/0020888 A1* | 9/2001 | Schon .................... H01H 85/46 337/142 |

(Continued)

FOREIGN PATENT DOCUMENTS

| CN | 107077991 | 2/2019 |
| JP | 06084446 A | 3/1994 |

(Continued)

OTHER PUBLICATIONS

"International Application Serial No. PCT/JP2020/008651, International Search Report mailed Jun. 2, 2020", w/ English Translation, (Jun. 2, 2020), 7.

(Continued)

*Primary Examiner* — Jacob R Crum
(74) *Attorney, Agent, or Firm* — Schwegman Lundberg & Woessner, P.A.

(57) ABSTRACT

This protective element includes a fuse element having a first end portion and a second end portion, in which current flows from the first end portion toward the second end portion, a protruding member and a recessed member that are positioned opposing one another so as to sandwich a cutoff portion, and a pressing device that imparts an elastic force that shortens the relative distance in a first direction that represents the direction in which the protruding member and the recessed member sandwich the cutoff portion, wherein at least one pair of opposing surfaces of a protruding portion of the protruding member and a recessed portion (Continued)

of the recessed member that intersect the direction of current flow through the fuse element are positioned close to one another when viewed in a plan view from the first direction, and the fuse element is cut at a temperature equal to or higher than the softening temperature of the material that constitutes the fuse element.

33 Claims, 20 Drawing Sheets

(51) Int. Cl.
  *H01H 85/36* (2006.01)
  *H01H 85/06* (2006.01)
  *H01H 85/08* (2006.01)

(56) References Cited

U.S. PATENT DOCUMENTS

| | | | |
|---|---|---|---|
| 2008/0117016 A1* | 5/2008 | Yu | H01H 85/36 337/401 |
| 2011/0211284 A1 | 9/2011 | Yoneda | |
| 2016/0240342 A1* | 8/2016 | Yoneda | H01H 85/08 |
| 2017/0263403 A1* | 9/2017 | Marlin | H01H 71/10 |

FOREIGN PATENT DOCUMENTS

| | | |
|---|---|---|
| JP | 2000021278 | 1/2000 |
| JP | 2006059568 A | 3/2006 |
| JP | 2007317420 A | 12/2007 |
| JP | 4192266 B2 | 12/2008 |
| JP | 2009259724 A | 11/2009 |
| JP | 2012521634 A | 9/2012 |
| JP | 2012234774 A | 11/2012 |
| JP | 6210647 B2 | 10/2017 |
| JP | 6249600 B2 | 12/2017 |
| JP | 6249602 B2 | 12/2017 |
| WO | WO-2010110877 A1 | 9/2010 |

OTHER PUBLICATIONS

"International Application Serial No. PCT/JP2020/008651, Written Opinion mailed Jun. 2, 2020", (Jun. 2, 2020), 3 pgs.

"Japanese Application Serial No. 2022-176116, Office Action dated Jul. 18, 2023", w English Translation, (Jul. 18, 2023), 6 pgs.

"Taiwanese Application Serial No. 109107240, Office Action dated Jun. 28, 2023", w English Translation, (Jun. 28, 2023), 8 pgs.

* cited by examiner (a)

(b)

(a)

(b)

PROTECTIVE ELEMENT

PRIORITY APPLICATIONS

This application is a U.S. National Stage Filing under 35 U.S.C. § 371 from International Application No. PCT/JP2020/008651, filed on Mar. 2, 2020, and published as WO2020/179728 on Sep. 10, 2020, which claims the benefit of priority to Japanese Application No. 2019-039888, filed on Mar. 5, 2019; the benefit of priority of each of which is hereby claimed herein, and which applications and publication are hereby incorporated herein by reference in their entirety.

TECHNICAL FIELD

The present invention relates to a protective element.

Priority is claimed on Japanese Patent Application No. 2019-039888, filed Mar. 5, 2019, the content of which is incorporated herein by reference.

BACKGROUND ART

Conventionally, protective elements fitted with a fuse element that heats and melts, thereby breaking the current path, when an electrical current exceeding the rated value flows through the element have been widely used.

Examples of widely used protective elements include holder-fixed fuses having a solder enclosed in a glass tube, chip fuses in which an Ag electrode is printed on the surface of a ceramic substrate, and screw-fastened or plug protective elements in which a portion of a copper electrode is narrowed and incorporated into a plastic case.

With these protective elements, surface mounting by reflow is difficult, and because the efficiency of component mounting is poor, surface-mounted protective elements have recently been developed (for example, see Patent Documents 1 and 2).

Surface-mounted protective elements are employed, for example, as a protective element against overcharging or overcurrent in a battery pack that uses a lithium ion secondary battery. Lithium ion secondary batteries are used in mobile equipment such as laptop computers, mobile phones and smart phones, and in recent years, have also started to be employed in electric tools, electric bikes, electric motorcycles, and electric vehicles. As a result, protective elements for use with large currents and high voltages are now required.

In protective elements for use with high voltages, an arc discharge can occur when the fuse element melts. When an arc discharge is generated, the fuse element melts over a wide area, and vaporized metal may sometimes be scattered. In such cases, there is a possibility that the scattered metal may form a new current path, or may adhere to terminals or surrounding electronic components or the like. Accordingly, in protective elements for use with high voltages, countermeasures are adopted which either prevent arc discharge generation or stop arc discharge.

One known countermeasure for either preventing arc discharge generation or stopping arc discharge involves packing an arc-extinguishing material around the fuse element (for example, see Patent Document 3).

Further, another known method for stopping arc discharge employs a protective element in which the fuse element and a spring in a torsioned state having an accumulated elastic restoring force are connected in series and bonded together using a low-melting point metal (for example, see Patent Documents 4 to 6). In this type of protective element, when an overcurrent flows through the element and melts the low-melting point metal, the elastic restoring force of the spring promotes separation between the spring and the fuse element, making a more rapid circuit breakage possible upon overcurrent.

Arc discharges are dependent on field intensity (voltage/distance), meaning an arc discharge does not stop until the distance between the contact points reaches at least a certain distance. Accordingly, protective elements that use a spring are able to rapidly stop arc discharge by utilizing the elastic restoring force of the spring to rapidly separate the spring and the fuse element to a distance where arc discharge can no longer be maintained.

PRIOR ART LITERATURE

Patent Documents

Patent Document 1: Japanese Patent (Granted) Publication No. 6249600
Patent Document 2: Japanese Patent (Granted) Publication No. 6249602
Patent Document 3: Japanese Patent (Granted) Publication No. 4192266
Patent Document 4: Japanese Unexamined Patent Application, First Publication No. Hei 06-84446
Patent Document 5: Japanese Unexamined Patent Application, First Publication No. 2006-59568
Patent Document 6: Japanese Unexamined Patent Application, First Publication No. 2012-234774
Patent Document 7: Japanese Patent (Granted) Publication No. 6210647

SUMMARY OF INVENTION

Problems to be Solved by the Invention

However, in the case of the aforementioned protective elements that use an arc-extinguishing material, the production process is complex, miniaturization of the protective element is difficult, and there is a possibility that melting of the fuse element as a result of the heating of a heat-generating body inside the protective element may be impaired.

Furthermore, in the case of the aforementioned protective elements that use a spring, the bonding strength between the fuse element and the spring tends to be prone to deterioration over time in the usage environment, meaning long-term stability can be a concern.

Patent Document 7 discloses a protective element using a spring of a different type from the protective elements using a spring described above. In this protective element, two locations are provided at which the fuse element can be easily cut, and in the case of an overcurrent circuit break, a cutting plunger that has been pre-stressed using a spring element is used to cut the fuse element.

In the case of this protective element, a fuse element having two easily cut locations must be prepared, and because the structure requires two locations to be cut by the cutting plunger, the cutting force must be dispersed across the two locations, meaning the force required for cutting the circuit must be increased accordingly.

The present invention has been developed in light of the above circumstances, and has an object of providing a protective element that suppresses the occurrence of arc discharge when the fuse element is cut, and enables rapid inhibition of arc discharge in those cases where an arc discharge occurs.

Means for Solving the Problems (1) A protective element according to one aspect of the present invention includes a fuse element having a first end portion and a second end portion, in which current flows from the first end portion toward the second end portion, a protruding member and a recessed member that are positioned opposing one another so as to sandwich a cutoff portion of the fuse element positioned between the first end portion and the second end portion, and a pressing device that imparts an elastic force that shortens the relative distance in a first direction that represents the direction in which the protruding member and the recessed member sandwich the cutoff portion, wherein at least one pair of opposing surfaces of a protruding portion of the protruding member and a recessed portion of the recessed member that intersect the direction of current flow through the fuse element are positioned close to one another when viewed in a plan view from the first direction, and the fuse element is cut at a temperature equal to or higher than the softening temperature of the material that constitutes the fuse element.

(2) The protective element according to (1), wherein the fuse element may be formed from one or a plurality of plate-like or wire-like parts.

(3) The protective element according to (1) or (2), wherein a first terminal member may be connected to the first end portion, and a second terminal member may be connected to the second end portion.

(4) The protective element according to any one of (1) to (3) may have a first electrode and a second electrode, wherein the first electrode is connected to the first end portion of the fuse element and the second electrode is connected to the second end portion of the fuse element.

(5) The protective element according to any one of (1) to (4), wherein the pressing device may be a spring or a rubber.

(6) The protective element according to any one of (1) to (5), wherein the recessed member may be provided with a guide that guides the protruding portion into the recessed portion.

(7) The protective element according to any one of (1) to (6) may also include a heating element, in a position near the protruding portion, that contacts the fuse element and heats the fuse element.

(8) The protective element according to (7), wherein the heating element comprises a heat-generating body, and further comprises an electrode layer electrically connected to the heat-generating body on a surface of the heating element on a fuse element side.

(9) The protective element according to (8) may have a third electrode, wherein one end of the heat-generating body is connected electrically to the electrode layer, and the other end of the heat-generating body is connected electrically to the third electrode.

(10) The protective element according to (8) or (9), wherein the heat-generating body may be positioned on the fuse element on the side of the protruding member.

(11) The protective element according to (8) or (9), wherein the heat-generating body may be positioned on the fuse element on the side of the recessed member.

(12) The protective element according to any one of (7) to (11), wherein the side surfaces of the heating element, the outside surfaces of the protruding portion, and the inside surfaces of the recessed portion may be electrically insulated.

(13) The protective element according to any one of (1) to (12), wherein the fuse element may be a laminated body having an inner layer composed of a low-melting point metal and an outer layer composed of a high-melting point metal.

(14) The protective element according to (13), wherein the low-melting point metal may be composed of Sn or a metal containing Sn as the main component, and the high-melting point metal may be composed of Ag or Cu, or a metal containing Ag or Cu as the main component.

(15) The protective element according to any one of (1) to (14), wherein in a state where a current exceeding the rated current flows through the fuse element, or state where a current is passed through the heat-generating body, the fuse element may be heated to a temperature equal to or higher than the softening temperature, and the fuse element may be cut, thereby cutting off current flow.

(16) The protective element according to any one of (1) to (15) may also include a support member, which is positioned inside the recessed portion of the recessed member, supports the fuse element from beneath either directly or indirectly, and is formed from a material that suppresses deformation of the fuse element at temperatures no higher than the temperature during rated current flow through the fuse element, but deforms under the force of the pressing device and allows cutting of the fuse element at temperatures equal to or higher than the solidus temperature of the material that constitutes the fuse element.

(17) A protective element according to another aspect of the present invention includes a fuse element having a first end portion and a second end portion, in which current flows from the first end portion toward the second end portion, a protruding member and a recessed member that are positioned opposing one another so as to sandwich a cutoff portion of the fuse element positioned between the first end portion and the second end portion, and a pressing device that imparts an elastic force that shortens the relative distance in a first direction that represents the direction in which the protruding member and the recessed member sandwich the cutoff portion, wherein at least one pair of opposing surfaces of a protruding portion of the protruding member and a recessed portion of the recessed member that intersect the direction of current flow through the fuse element are positioned close to one another when viewed in a plan view from the first direction, a heating element that heats and melts the fuse element is also provided in contact with the fuse element in a position near the protruding portion, and the fuse element is cut by heating the heating element.

(18) The protective element according to (17), wherein the fuse element may be formed from one or a plurality of plate-like or wire-like parts.

(19) The protective element according to (17) or (18) may also have a first electrode and a second electrode, wherein the first electrode is connected to the first end portion of the fuse element, and the second electrode is connected to the second end portion of the fuse element.

(20) The protective element according to any one of (17) to (19), wherein the pressing device may be a spring or a rubber.

(21) The protective element according to any one of (17) to (20), wherein the recessed member may be provided with a guide that guides the protruding portion into the recessed portion.

(22) The protective element according to any one of (17) to (20), wherein the heating element comprises a heat-generating body, and further comprises an electrode layer electrically connected to the heat-generating body on a surface of the heating element on a fuse element side.

(23) The protective element according to (22) may have a third electrode, wherein one end of the heat-generating body is connected electrically to the electrode layer, and the other end of the heat-generating body is connected electrically to the third electrode.

(24) The protective element according to (22) or (23), wherein the heat-generating body may be positioned on the fuse element on the side of the protruding member.

(25) The protective element according to (22) or (23), wherein the heat-generating body may be positioned on the fuse element on the side of the recessed member.

(26) The protective element according to any one of (17) to (25), wherein the side surfaces of the heating element, the outside surfaces of the protruding portion, and the inside surfaces of the recessed portion may be electrically insulated.

(27) The protective element according to any one of (17) to (26), wherein the fuse element may be a laminated body having an inner layer composed of a low-melting point metal and an outer layer composed of a high-melting point metal.

(28) The protective element according to (27), wherein the low-melting point metal may be composed of Sn or a metal containing Sn as the main component, and the high-melting point metal may be composed of Ag or Cu, or a metal containing Ag or Cu as the main component.

(29) The protective element according to any one of (17) to (28) may also include a support member, which is positioned inside the recessed portion of the recessed member, supports the fuse element from beneath either directly or indirectly, and is formed from a material that suppresses deformation of the fuse element at temperatures no higher than the temperature during rated current flow through the fuse element, but deforms under the force of the pressing device and allows cutting of the fuse element at temperatures equal to or higher than the solidus temperature of the material that constitutes the fuse element.

(30) A protective element according to another aspect of the present invention includes a first electrode and a second electrode, a fuse element connected by a solder at both end surfaces to the first electrode and the second electrode respectively, a protruding member and a recessed member that are positioned opposing one another so as to sandwich the fuse element, and a pressing device that imparts an elastic force that shortens the relative distance in a first direction that represents the direction in which the protruding member and the recessed member sandwich the fuse element, wherein at least one pair of opposing surfaces of a protruding portion of the protruding member and a recessed portion of the recessed member that intersect the direction of current flow through the fuse element are positioned close to one another when viewed in a plan view from the first direction, one end surface of the fuse element that is connected to either the first electrode or the second electrode is positioned inside the opening of the recessed portion when viewed in a plan view from the first direction, and the connection between the one end surface and the first electrode or the second electrode is cut at a temperature equal to or higher than the softening temperature of the metal material that constitutes the solder.

(31) A protective element according to another aspect of the present invention includes a first electrode and a second electrode, a fuse element connected by a solder at both end surfaces to the first electrode and the second electrode respectively, a protruding member and a recessed member that are positioned opposing one another so as to sandwich the fuse element, and a pressing device that imparts an elastic force that shortens the relative distance in a first direction that represents the direction in which the protruding member and the recessed member sandwich the fuse element, wherein at least one pair of opposing surfaces of a protruding portion of the protruding member and a recessed portion of the recessed member that intersect the direction of current flow through the fuse element are positioned close to one another when viewed in a plan view from the first direction, one end surface of the fuse element that is connected to either the first electrode or the second electrode is positioned inside the opening of the recessed portion when viewed in a plan view from the first direction, a heating element that heats and melts the fuse element is provided in contact with the fuse element in a position near the protruding portion, and the connection between the one end surface and the first electrode or the second electrode is cut by heating the heating element.

(32) A protective element according to another aspect of the present invention includes a first electrode and a second electrode, a fuse element connected by a solder at both end surfaces to the first electrode and the second electrode respectively, a protruding member and a recessed member that are positioned opposing one another so as to sandwich the fuse element, and a pressing device that imparts an elastic force that shortens the relative distance in a first direction that represents the direction in which the protruding member and the recessed member sandwich the fuse element, wherein at least one pair of opposing surfaces of a protruding portion of the protruding member and a recessed portion of the recessed member that intersect the direction of current flow through the fuse element are positioned close to one another when viewed in a plan view from the first direction, both end surfaces of the fuse element that are connected to the first electrode and the second electrode are positioned inside the opening of the recessed portion when viewed in a plan view from the first direction, and at least one connection between the end surfaces of the fuse element and the first electrode or the second electrode is cut at a temperature equal to or higher than the softening temperature of the metal material that constitutes the solder.

(33) A protective element according to another aspect of the present invention includes a first electrode and a second electrode, a fuse element connected by a solder at both end surfaces to the first electrode and the second electrode respectively, a protruding member and a recessed member that are positioned opposing one another so as to sandwich the fuse element, and a pressing device that imparts an elastic force that shortens the relative distance in a first direction that represents the direction in which the protruding member and the recessed member sandwich the fuse element, wherein at least one pair of opposing surfaces of a protruding portion of the protruding member and a recessed portion of the recessed member that intersect the direction of current flow through the fuse element are positioned close to one another when viewed in a plan view from the first direction, both end surfaces of the fuse element that are connected to the first electrode and the second electrode are positioned inside the opening of the recessed portion when viewed in a plan view from the first direction, a heating element that heats and melts the fuse element is provided in contact with the fuse element in a position near the protruding portion, and at least one connection between the end surfaces of the fuse element and the first electrode or the second electrode is cut by heating the heating element.

Effects of the Invention

The present invention is able to provide a protective element that suppresses the occurrence of arc discharge when the fuse element is cut, and enables rapid inhibition of arc discharge in those cases where an arc discharge occurs.

EMBODIMENTS FOR CARRYING OUT THE INVENTION

Embodiments of the present invention are described below in detail with reference to the drawings. The drawings used in the following description may sometimes be drawn with specific portions enlarged as appropriate to facilitate comprehension of the features of the present invention, and the dimensional ratios and the like between the constituent elements may differ from the actual values. Further, the materials and dimensions and the like presented in the following description are merely examples, which in no way limit the present invention, and may be altered as appropriate within the scope of the present invention.

First Embodiment

Figure 1:
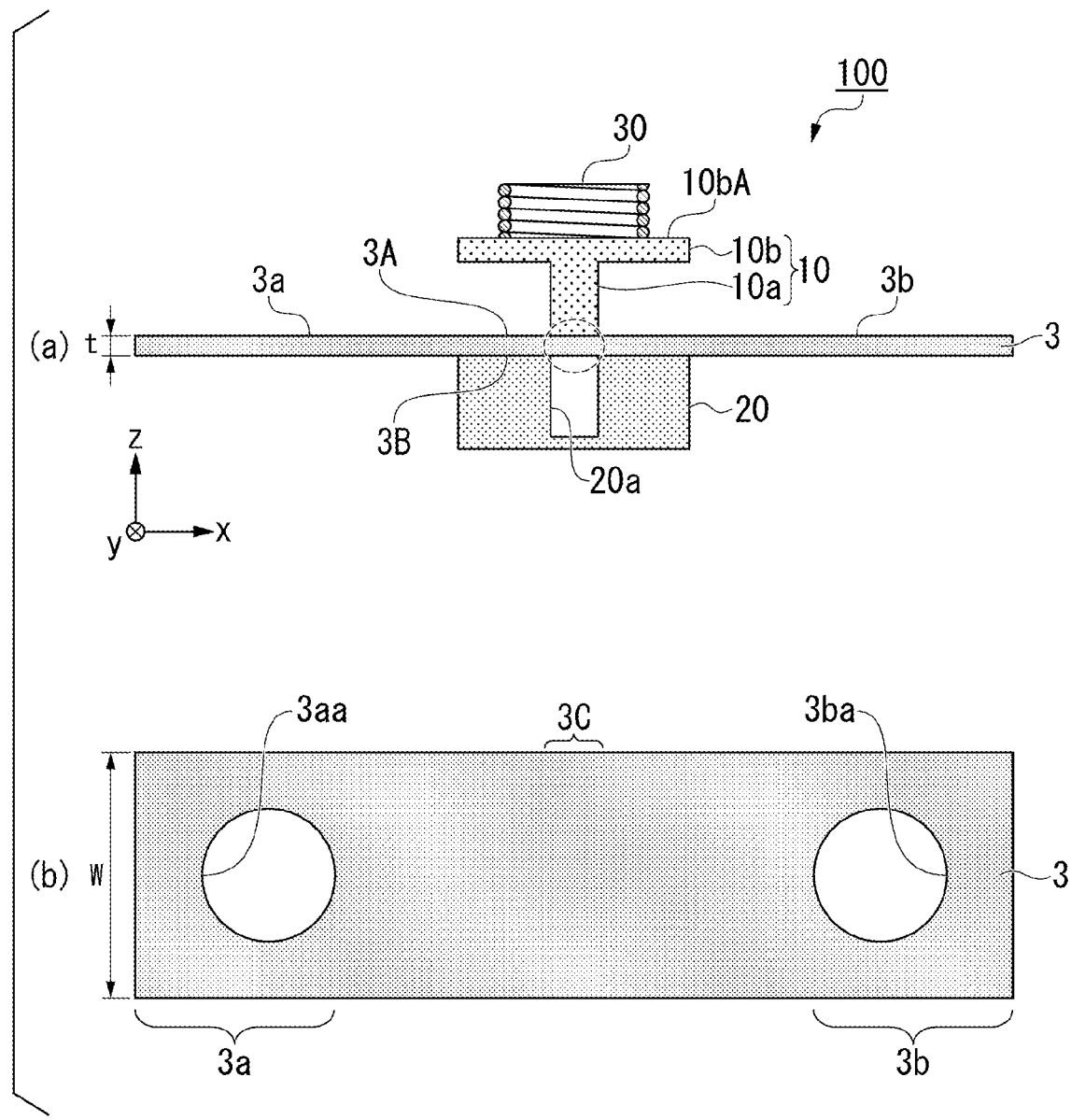
FIG. 1 is a series of schematic views of the main components of a protective element according to a first embodiment, wherein (a) is a schematic cross-sectional view, and (b) is a schematic plan view of the fuse element.

FIG. 1 is a series of schematic views of the main components of a protective element according to the first embodiment, wherein (a) is a schematic cross-sectional view, and (b) is a schematic plan view of the fuse element.

Figure 2:
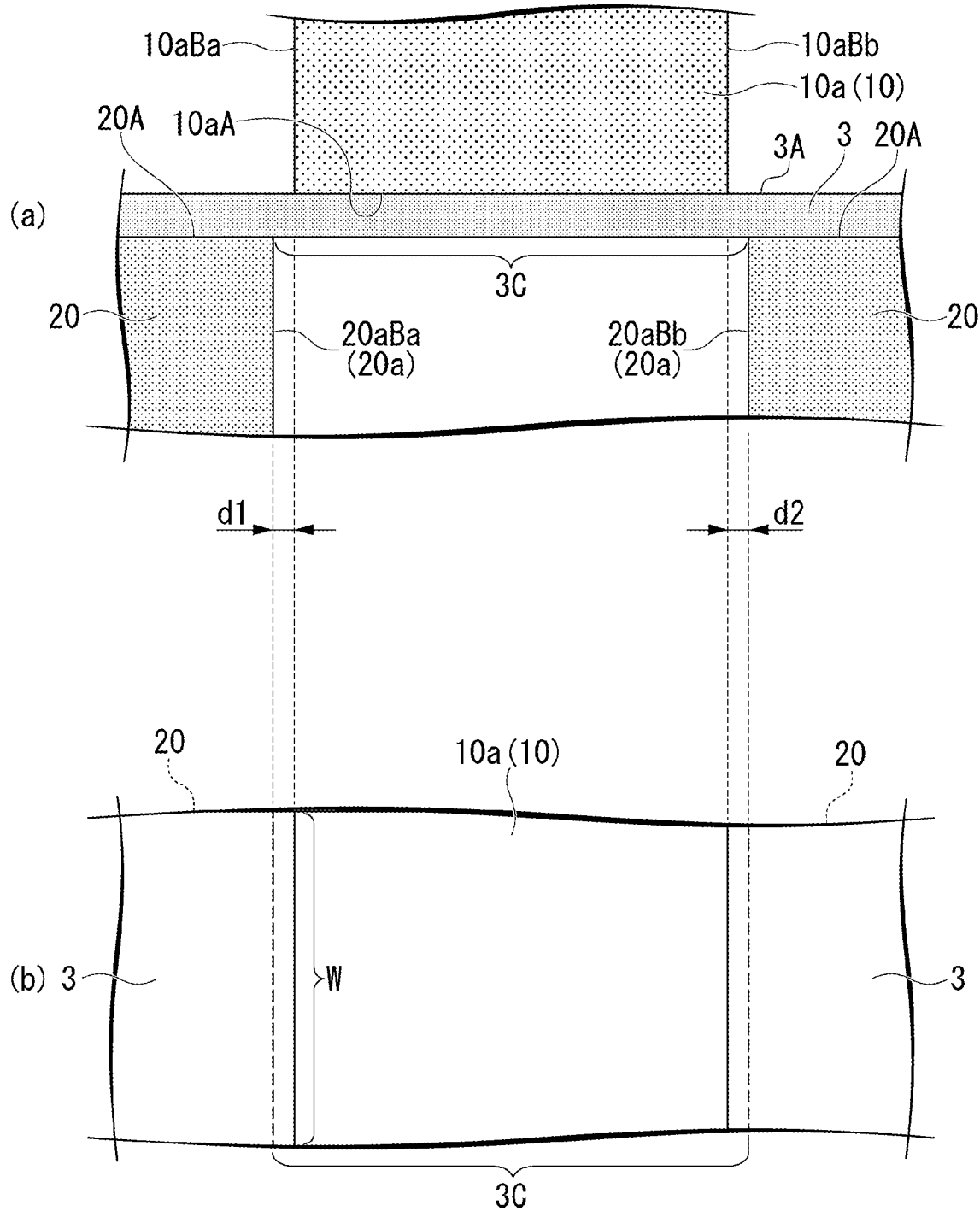
FIG. 2 is a series of enlarged views of the location circled with a dotted line in FIG. 1(a), wherein (a) is a schematic cross-sectional view, and (b) is a schematic plan view.

FIG. 2 is a series of enlarged views of the location circled with a dotted line in FIG. 1(a), wherein (a) is a schematic cross-sectional view, and (b) is a schematic plan view.

The fuse element illustrated in FIG. 1 is an example of an element that has a rectangular plate-like shape when viewed in a plan view, and in FIG. 1(a), the direction indicated by x is the lengthwise direction of the fuse element (the direction of current flow), the direction indicated by y is the width direction of the fuse element (a direction orthogonal to the lengthwise direction), and the direction indicated by z is the direction orthogonal to the direction x and the direction y.

The protective element 100 illustrated in FIG. 1 includes a fuse element 3 having a first end portion 3a and a second end portion 3b, in which current flows from the first end portion 3a toward the second end portion 3b, a protruding member 10 and a recessed member 20 that are positioned opposing one another so as to sandwich a cutoff portion 3C of the fuse element 3 positioned between the first end portion 3a and the second end portion 3b, and a pressing device 30 that imparts an elastic force that shortens the relative distance in a first direction (the z direction) that represents the direction in which the protruding member 10 and the recessed member 20 sandwich the cutoff portion 3C, wherein at least one pair of opposing surfaces of a protruding portion 10a of the protruding member 10 and a recessed portion 20a of the recessed member 20 that intersect the direction of current flow (the x direction) through the fuse element 3 (namely, at least one pair of opposing surfaces among an outside surface 10aBa and an inside surface 20aBa, and an outside surface 10aBb and an inside surface 20aBb) are positioned close to one another when viewed in a plan view from the first direction (the z direction), and the fuse element 3 is cut at a temperature equal to or higher than the softening temperature of the material that constitutes the fuse element 3.

<Fuse Element>

Fuse elements composed of materials used in conventional fuse elements may be used as the fuse element 3. Typically, a fuse element composed of a metal material containing an alloy may be used. Specific examples of the material include Pb 85%/Sn and Sn/Ag 3%/Cu 0.5%.

The fuse element 3 is cut at temperatures equal to or higher than the softening temperature of the material that constitutes the fuse element 3. The temperature may be equal to or higher than the softening temperature, and therefore cutoff may occur at the "softening temperature".

[Softening Temperature]

In this description, the "softening temperature" means the temperature or temperature range at which the solid phase and the liquid phase are mixed or coexist. The softening temperature is the temperature or temperature band (temperature range) at which the fuse element softens sufficiently to allow the deformation under the action of an external force.

For example, in those cases where the material that constitutes the fuse element is a two-component alloy, the temperature range between the solidus line (the temperature at which melting begins) and the liquidus line (the temperature at which complete melting occurs) is a region in which the solid phase and the liquid phase are mixed in a so-called sherbet state. This temperature range at which the solid phase and liquid phase are mixed or coexist is the temperature range at which the alloy softens sufficiently to allow the fuse element to deform under the action of an external force, and this temperature range represents the "softening temperature".

In those cases where the material that constitutes the fuse element is a three-component alloy or multicomponent alloy, then if the above terms "solidus line" and "liquidus line" are replaced with "solidus surface" and "liquidus surface" respectively, then in a similar manner to that described above, the temperature range at which the solid phase and liquid phase are mixed or coexist is the "softening temperature".

On the other hand, in the case of an alloy, because there is a temperature difference between the solidus line and the liquidus line, the "softening temperature" has a temperature range, whereas in those cases where the material that constitutes the fuse element is a single metal, a solidus line and liquidus line do not exist, and a single melting point/solid point exists. At the melting point or solid point, the solid phase and liquid phase are mixed or coexist, and therefore in the case of a fuse element composed of a single metal, the melting point or solid point represents the "softening temperature" in this description.

Measurement of the solidus line and the liquidus line can be conducted by measuring the discontinuous point (the temperature at which a plateau occurs over time) as a result of latent heat that accompanies a phase change during the temperature increase process. Both alloy materials and single metals having a temperature or temperature range at which the solid phase and liquid phase are mixed or coexist can be used as the fuse element of the present invention.

The fuse element 3 illustrated in FIG. 1 is composed of a single member (part), but fuse elements composed of a plurality of members (parts) may also be used.

Further, there are no particular limitations on the shape of the single member, or the shapes of the plurality of members, that constitute the fuse element 3, provided the structure can function as a fuse, and examples of the shape include plate-like and wire-like shapes.

The fuse element 3 illustrated in FIG. 1 is a plate-like member.

The thickness t and width w of this fuse element 3 undergo no substantial deformation upon current flow during normal operation, but when an overcurrent flows or when heating of the heat-generating body described below is conducted, the thickness t and width w may adopt any dimension that enables cutoff by the pressing device.

In the fuse element 3 illustrated in FIG. 1, the first end portion 3a and the second end portion 3b include an external terminal hole 3aa and an external terminal hole 3ba respectively.

Among the external terminal hole 3aa and the external terminal hole 3ba, one of the external terminal holes may be used for connection to a power source side, and the other external terminal hole may be used for connection to the load side.

There are no particular limitations on the shapes of the external terminal hole 3aa and the external terminal hole 3ba, provided they are capable of engaging with the terminals on the power source side and the load side respectively which are not shown in the drawing, and although the external terminal hole 3aa and external terminal hole 3ba illustrated in FIG. 1(b) are through-holes with no exterior openings, claw-like shapes or the like having a partial exterior opening may also be used.

The fuse element 3 illustrated in FIG. 1 has the cutoff portion 3C positioned between the first end portion 3a and the second end portion 3b.

The cutoff portion 3C is the region that aligns with the opening of the recessed portion 20a of the recessed member 20 when viewed in a plan view from the z direction. The cutoff portion 3C is a region that can be easily cut, but the location at which cutoff actually occurs may sometimes not be within the cutoff portion 3C.

In those cases where the fuse element 3 is composed of a plurality of regions (for example, layers or wires) formed from materials having different softening temperatures, the fuse element 3 is cut at a temperature equal to or higher than the lowest softening temperature.

In such a configuration, the layers shift to a mixed state of a solid phase and a liquid phase in sequence beginning with the material having the lowest softening temperature, but in the protective element of embodiments of the present invention, because the pressing device causes the protruding member and the recessed member to impart a shearing force to the fuse element 3, the fuse element 3 may be cut even if all of the layers have not reached their respective softening temperatures. In such a configuration, if the regions are considered individually, then some regions can be said to have melted, and some to have sheared.

For example, the fuse element 3 may be a laminated body compose of a plurality of layers formed from materials having different softening temperatures. In this type of configuration, the rigidity of those layers formed from a material having a higher softening temperature is maintained, while those layers formed from a material having a low softening temperature can soften and cause cutting of the fuse element 3 at low temperature.

In those cases where the fuse element 3 has this type of configuration, the layers shift to a mixed state of a solid phase and a liquid phase in sequence beginning with the layer formed from the material having the lowest softening temperature, but the fuse element 3 may be cut even if all of the layers have not reached their respective softening temperatures.

In those cases where the fuse element 3 is a laminated body formed from three layers compose of an inner layer and outer layers, it is preferable that the inner layer is a low-melting point metal layer and the outer layers are high-melting point metal layers, but a configuration in which the outer layers are low-melting point metal layers and the inner layer is a high-melting point metal layer may also be used.

Because the softening temperature of the high-melting point metal layer is higher than the softening temperature of the low-melting point metal layer, within the laminated body that constitutes the fuse element 3, conversion to a mixed state containing a solid phase and a liquid phase starts in the low-melting point metal layer, and the fuse element 3 may be cut before the high-melting point metal layer reaches the softening temperature.

The low-melting point metal used in the low-melting point metal layer is preferably Sn or a metal containing Sn as the main component. This preference is because Sn has a melting point of 232° C., and therefore metals containing Sn as the main component have low melting points and soften at low temperatures.

For example, the solidus line of a Sn/Ag 3%/Cu 0.5% alloy is 217° C.

The high-melting point metal used in the high-melting point metal layer is preferably Ag, Cu, or a metal containing one of these metals as the main component. For example, Ag has a melting point of 962° C., and therefore a high-melting point metal layer formed from a metal containing Ag as the main component is able to maintain rigidity at the temperature at which the low-melting point metal layer softens.

The structure of the laminated body may adopt any of various structures.

Figure 3:
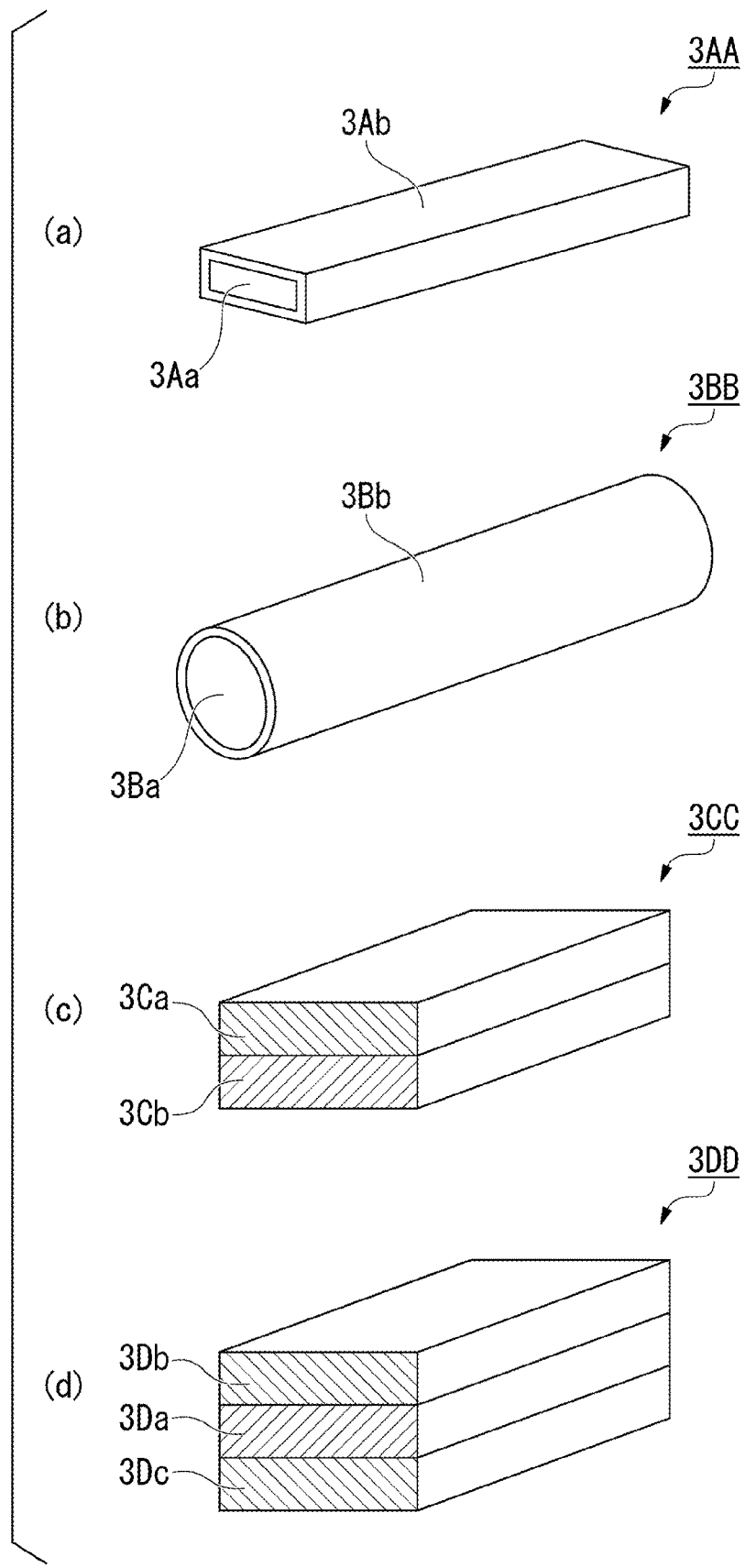
FIG. 3 is a series of perspective views schematically illustrating examples of structures of laminated bodies, wherein (a) is a rectangular or plate-like body in which the inner layer is a low-melting point metal layer and the outer layer is a high-melting point metal layer, (b) is a circular rod-shaped body in which the inner layer is a low-melting point metal layer and the outer layer is a high-melting point metal layer, (c) is a rectangular or plate-like body having a two-layer structure in which a low-melting point metal layer and a high-melting point metal layer are laminated together, and (d) is a rectangular or plate-like body having a three-layer structure in which a low-melting point metal layer is sandwiched between high-melting point metal layers.

FIG. 3 shows perspective views schematically illustrating examples of the structure of the laminated body.

The laminated body (fuse element) 3AA illustrated in FIG. 3(a) is a rectangular or plate-like body in which the inner layer is a low-melting point metal layer 3Aa and the outer layer is a high-melting point metal layer 3Ab, but the inner layer and the outer layer may also be reversed.

The laminated body (fuse element) 3BB illustrated in FIG. 3(b) is a circular rod-shaped body in which the inner layer is a low-melting point metal layer 3Ba and the outer layer is a high-melting point metal layer 3Bb, but the inner layer and the outer layer may also be reversed.

The laminated body (fuse element) 3CC illustrated in FIG. 3(c) is a rectangular or plate-like body having a two-layer structure in which a low-melting point metal layer 3Ca and a high-melting point metal layer 3Cb are laminated together.

The laminated body (fuse element) 3DD illustrated in FIG. 3(d) is a rectangular or plate-like body having a three-layer structure in which a low-melting point metal layer 3Da is sandwiched between a high-melting point metal layer 3Db and a high-melting point metal layer 3Dc. Alternatively, a three-layer structure in which a high-melting point metal layer is sandwiched between two low-melting point metal layers may also be used.

FIGS. 3(a) to (d) illustrate two-layer or three-layer laminated bodies, but laminate bodies having four or more layers may also be used.

<Relationship Between Protruding Member and Recessed Member>

In the protective element 100 illustrated in FIG. 1, the protruding portion 10a of the protruding member 10 has a rectangular shape having a bottom surface 10aA parallel with the xy plane, an outside surface 10aBa and an outside surface 10aBb parallel with the yz plane, and a pair of outside surfaces (not labeled in the drawing) parallel with the xz plane. Further, in order to enable insertion of the protruding portion 10a, the recessed portion 20a of the recessed member 20 has an opening (space) that corresponds with the rectangular shape of the protruding por-tion 10a, and has an outside inside surface 20aBa and an inside surface 20aBb parallel with the yz plane, and a pair of inside surfaces (not labeled in the drawing) parallel with the xz plane.

In the protective element 100 illustrated in FIG. 1, the two sets of opposing surfaces of the protruding portion 10a of the protruding member 10 and the recessed portion 20a of the recessed member 20 that intersect the direction of current flow through the fuse element 3 (the x direction), namely the outside surface 10aBa and the inside surface 20aBa, and the outside surface 10aBb and the inside surface 20aBb, are positioned close to one another when viewed in a plan view from the thickness direction (the z direction).

In the protective element 100 illustrated in FIG. 1, the outside surface 10aBa and the inside surface 20aBa, and the outside surface 10aBb and the inside surface 20aBb need only intersect the direction of current flow through the fuse element 3 (the x direction), and an orthogonal intersection is merely one example.

The protruding member 10 and the recessed member 20 are each described below in further detail.

<Protruding Member>

The protruding member 10 includes at least the protruding portion 10a having the end surface 10aA, and is positioned on the opposite side of the fuse element 3 from the recessed member 20 in the thickness direction of the fuse element 3 (the z direction).

The protruding portion 10a of the protruding member 10 is formed with a shape that can penetrate inside the recessed portion 20a of the recessed member 20 when the fuse element 3 is cut.

In the protective element 100 illustrated in FIG. 1, the protruding member 10 has a shape that engages with the recessed portion 20a of the recessed member 20 across the direction of current flow through the fuse element 3 (the x direction).

The term "engages" is described below using FIG. 2.

When viewed in a plan view from the z direction, in the direction of current flow through the fuse element 3 (the x direction), the separation distance d1 between the outside surface 10aBa of the protruding portion 10a on the side of the first end portion 3a and the inside surface 20aBa of the recessed portion 20a on the side of the first end portion 3a, and the separation distance d2 between the outside surface 10aBb of the protruding portion 10a on the side of the second end portion 3b and the inside surface 20aBb of the recessed portion 20a on the side of the second end portion 3b are small, and the configuration when the protruding portion 10a is inserted inside the recessed portion 20a with the outside surfaces of the protruding portion 10a contacting the inside surfaces of the recessed portion 20a is referred to as "engagement" in this description.

A configuration in which the outside surface 10aBa "engages" with the inside surface 20aBa and the outside surface 10aBb "engages" with the inside surface 20aBb is one example of a configuration in which these pairs of opposing surfaces are "positioned close to one another", and although there are no particular limitations on the separation distance d1 and the separation distance d2, typical values are within a range from 0.1 to 0.2 mm, and preferably from 0.02 to 0.1 mm. The separation distance d1 and the separation distance d2 may be the same or different.

If the protruding portion 10a and the recessed portion 20a have shapes that mutually engage, namely, if the distance d1 and the distance d2 are sufficiently small distances that the portions make contact upon insertion, then when a force is applied in a direction that narrows the relative distance between the protruding member 10 and the recessed member 20, the fuse element 3 can be readily cut by the resulting shearing force. In this description, the term "shearing" refers to an action that scissors the fuse element, and the term "shearing force" describes a force that imparts an action wherein a pair of forces of opposing directions act in parallel to a cross-section of the fuse element, exposing the fuse element to a slicing action along that surface.

By ensuring that the protruding portion 10a and the recessed portion 20a have shapes that mutually engage, a shearing action can be more easily generated.

In the protective element 100 illustrated in FIG. 1, the protruding portion 10a is illustrated with dimensions that engage with the recessed portion 20a in the direction of current flow through the fuse element 3 (the x direction), but the protruding portion 10a may also have dimensions that engage with the recessed portion 20a in the width direction (the y direction) that intersects the direction of current flow through the fuse element 3.

In order to facilitate cutting of the fuse element 3, the width (in the y direction) of the protruding member 10 is preferably either the same as, or wider than, the width of the fuse element 3.

Examples of specific shapes of the outside surfaces of the protruding portion 10a include shapes in which the cross-sectional shape of the surfaces parallel with the xy plane are rectangular or square, but the invention is not restricted to these shapes.

The protruding member 10 is formed from either a material that can maintain a hard state, or a material that undergoes no substantial deformation, at the softening temperature of the material that constitutes the fuse element. Specifically, a ceramic material or a resin material having a high glass transition temperature can be used.

In this description, the glass transition temperature (Tg) of a resin material refers to the temperature at which the material shifts from a soft rubbery state to a hard glass state. When a resin is heated to a temperature at least as high as the glass transition temperature, the molecules move more readily, resulting in a soft rubbery state. On the other hand, when the resin is cooled, movement of the molecules is restricted, resulting in a glass state.

Examples of ceramic materials include alumina and zirconia. When a material having high thermal conductivity such as alumina is used, the heat generated from the fuse element is efficiently dissipated externally, enabling the fuse element to be heated and melted locally.

Examples of resin materials having a high glass transition temperature include nylon-based resins, fluororesins, silicone-based resins and PPS resins. Resin materials typically have a lower thermal conductivity than ceramic materials, but can be obtained at low cost.

Further, nylon-based resins, in particular, have superior tracking resistance (resistance to tracking (carbonized conduction path) breakdown) of 250 V or higher. The tracking resistance can be determined by testing based on IEC 60112. Among nylon-based resins, the use of nylon 46, nylon 6T or nylon 9T is preferred, and this enables tracking resistance of 600 V or higher to be achieved.

In those cases where the protruding member 10 is produced using a material other than a resin, such as a ceramic material, a portion of the protruding member 10 such as the end surface 10aA may be coated with a nylon-based resin.

<Recessed Member>

The recessed member 20 includes at least the recessed portion 20a, and is positioned on the opposite side of the fuse element 3 from the protruding member 10 in the thickness direction of the fuse element 3 (the z direction).

The recessed portion 20a of the recessed member 20 is formed with a shape that enables insertion of the protruding portion 10a of the protruding member 10 when the fuse element 3 is cut.

In the protective element 100 illustrated in FIG. 1, as described above, the recessed portion 20a has a shape that engages with the protruding portion 10a of the protruding member 10.

Examples of specific shapes of the inside surfaces of the recessed portion 20a includes shapes in which the cross-sectional shape of the surfaces parallel with the xy plane are rectangular or square, but the invention is not restricted to these shapes.

The same types of materials as those used for the protruding member 10 may be used for the recessed member 20.

Further, in a similar manner to the protruding member 10, in those cases where the recessed member 20 is produced using a material other than a resin, such as a ceramic material, a portion of the recessed member 20 may be coated with a nylon-based resin.

The expression that the protruding member 10 and the recessed member 20 sandwich the cutoff portion 3C of the fuse element 3 means that the protruding member 10 and the recessed member 20 contact and sandwich the fuse element 3 from above and below, and that when viewed in a plan view from the z direction, the protruding member 10 and the recessed member 20 overlap the cutoff portion 3C. The protruding member 10 and the recessed member 20 need not necessarily both contact the cutoff portion 3C.

<Pressing Device>

For the pressing device 30, any conventional device may be used that is capable of imparting an elastic force that shortens the relative distance in the direction (the z direction) in which the protruding member 10 and the recessed member 20 sandwich the cutoff portion 3C of the fuse element 3. Examples of the pressing device include a spring or a rubber.

In the protective element 100 illustrated in FIG. 1, a spring is used as the pressing device 30, wherein the spring is mounted on the upper surface 10bA of the base portion 10b of the protruding member 10, and is held in a compressed state.

In the protective element 100 illustrated in FIG. 1, the pressing device 30 is installed on the side of the protruding member 10, but may also be installed on the side of the recessed member 20, or alternatively, a configuration in which pressing devices are installed on both the side of the protruding member 10 and the side of the recessed member 20 may be used.

By using a configuration in which pressing devices are installed on both the side of the protruding member 10 and the side of the recessed member 20, the strength of the elastic force can be increased, and in a case where a fault develops in one of the pressing devices 30, the fuse element can still function via the other pressing device 30.

In those cases where pressing devices 30 are installed on both the side of the protruding member 10 and the side of the recessed member 20, the two pressing devices 30 may be the same or different.

Further, a plurality of pressing devices 30 may also be installed on either one side or both sides among the side of the protruding member 10 and the side of the recessed member 20.

In the case of a configuration in which a plurality of pressing devices 30 are provided, the elastic force can be adjusted by using pressing devices having mutually different compression levels.

When a spring is used as the pressing device 30, conventional materials may be used as the spring material.

In the protective element 100 of the present embodiment, in a state where a current exceeding the rated current flows through the fuse element 3, the fuse element 3 is heated to a temperature equal to or higher than the softening temperature, thereby cutting the fuse element 3 and cutting off current flow.

In the protective element 100, the protruding member 10 and the recessed member 20 are exposed to the elastic force of the pressing device 30 and imparted with a shearing force that acts to shear the fuse element 3, and therefore the fuse element 3 can be cut even without reaching a completely melted state. The timing at which the fuse element 3 is cut is determined by factors such as the composition of the fuse element 3, the configurations of the protruding member 10 and the recessed member 20, and the elastic force of the pressing device 30.

The protective element 100 differs from the spring-type protective elements described above in which the connection between the fuse element and the spring is pulled apart in terms of the fact that the fuse element itself is physically cut.

Further, arc discharge is dependent on field intensity, which is inversely proportional to distance, and in the protective element 100, because the distance between the cut surfaces of the cut fuse element is increased rapidly by the elastic force, even if an arc discharge occurs, that discharge can be rapidly stopped.

Furthermore, in the protective element 100, the fuse element can be cut at a temperature at which the fuse element has softened prior to reaching a completely melted state, or a temperature at which the solid phase and the liquid phase are mixed, namely the softening temperature, and therefore even the occurrence of arc discharges can be reduced.

A notch that facilitates cutoff may be inserted in the fuse element 3 in a location where the shearing force acts forcefully when viewed in a plan view from the thickness direction (the z direction).

Modified Example

Figure 4:
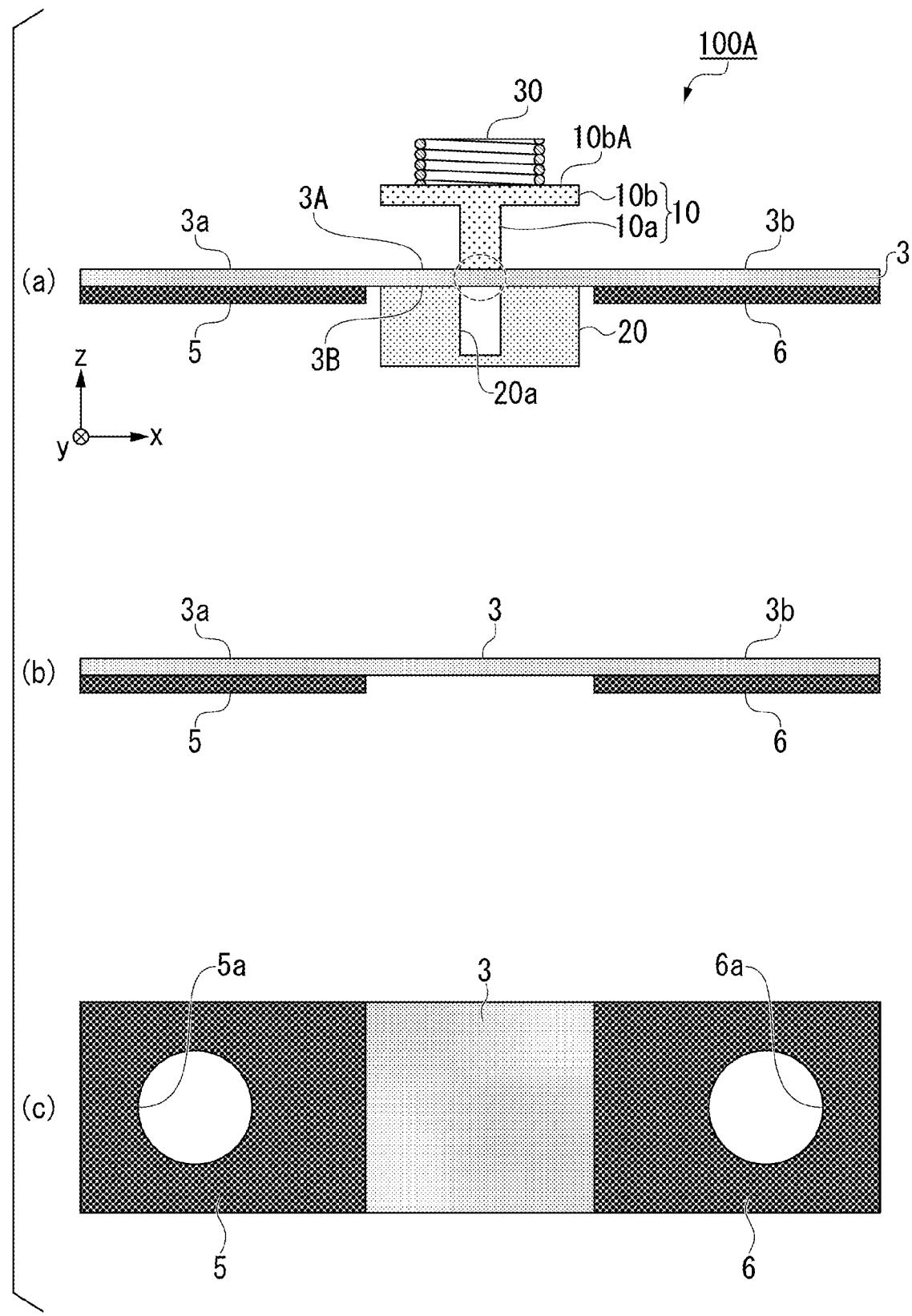
FIG. 4 is a series of schematic views of a modified example of the protective element according to the first embodiment, wherein (a) is a schematic cross-sectional view, (b) is a schematic side view of the fuse element and the terminal members, and (c) is a schematic plan view from beneath (the −z side) of the fuse element and terminal members illustrated in (b).

FIG. 4 is a series of schematic views of a modified example of the protective element according to the first embodiment, wherein (a) is a schematic cross-sectional view, (b) is a schematic side view of the fuse element and the terminal members, and (c) is a schematic plan view from beneath (the −z side) of the fuse element and terminal members illustrated in (b). Those members using the same symbols in the above drawings are deemed to have the same configuration, and description of those members is omitted. Further, even descriptions of members having a different symbol from the above drawings may sometimes be omitted if the function of the member is the same.

<First Terminal Member, Second Terminal Member>

In the protective element 100A illustrated in FIG. 4, the main points of difference from the protective element 100 are that a first terminal member 5 is connected so as to overlap in the thickness direction with the first end portion 3a of the fuse element 3, and a second terminal member 6 is connected so as to overlap in the thickness direction with the second end portion 3b.

The first terminal member and the second terminal member reinforce the rigidity for external connection of the fuse element, and also reduce the electrical resistance.

The first terminal member 5 has an external terminal hole 5a in a position corresponding with the external terminal hole 3aa of the first end portion 3a, and the second terminal member 6 has an external terminal hole 6a in a position corresponding with the external terminal hole 3ba of the second end portion 3b.

Examples of the material for the first terminal member and the second terminal member include copper and brass.

Of those materials, from the viewpoint of strengthening the rigidity, brass is preferred.

Of those materials, from the viewpoint of reducing electrical resistance, copper is preferred.

The materials for the first terminal member and the second terminal member may be the same or different.

Conventional methods may be used for connecting the first terminal member and the second terminal member to the first end portion and the second end portion respectively, and examples of suitable methods include bonding by soldering or welding, and mechanical joining methods such as riveting or screwing.

Although there are no particular limitations on the thickness of the first terminal member and the second terminal member, typical values are within a range from 0.3 to 1.0 mm.

The thicknesses of the first terminal member and the second terminal member may be the same or different.

Second Embodiment

Figure 5:
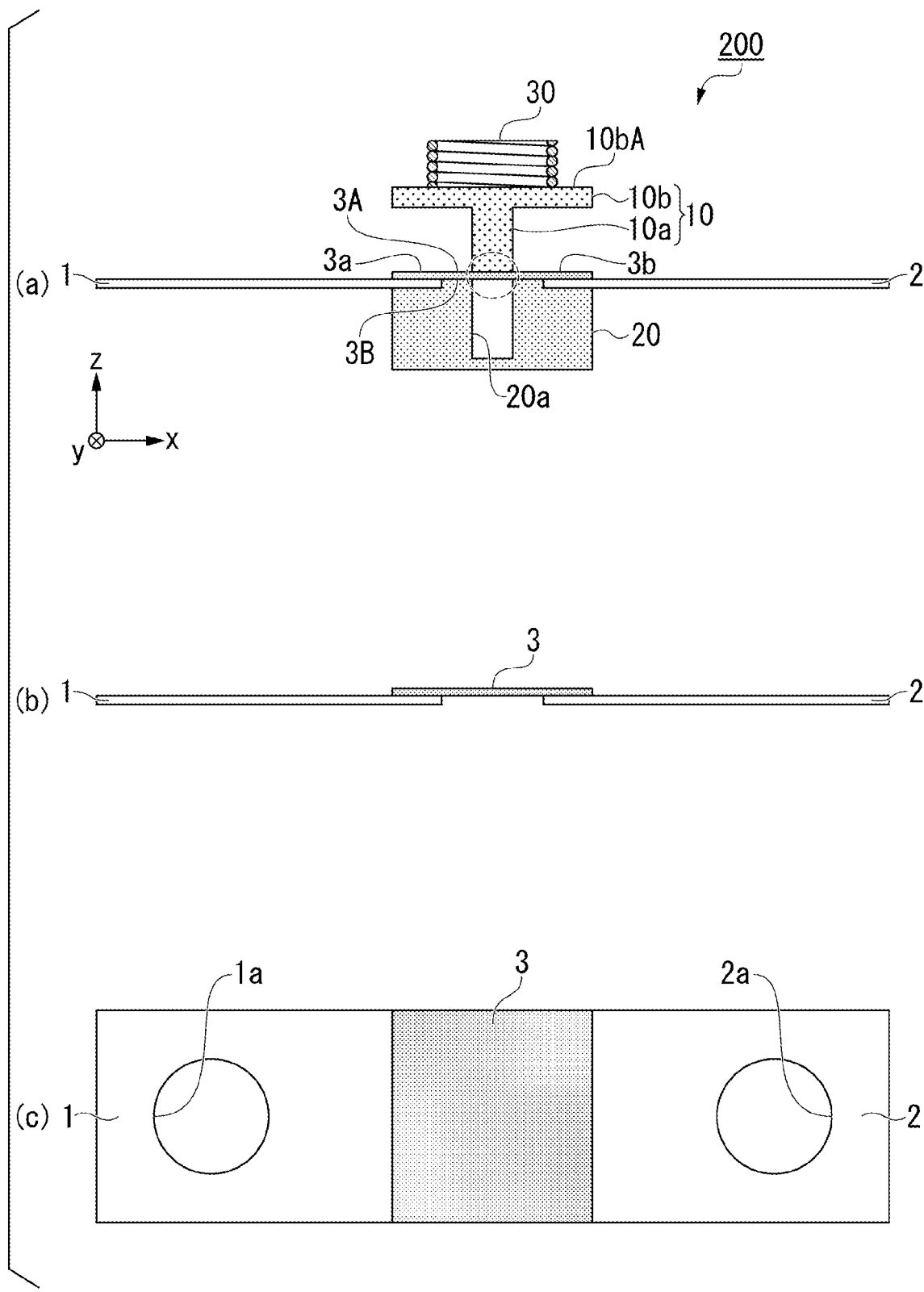
FIG. 5 is a series of schematic views of the main components of a protective element according to a second embodiment, wherein (a) is a schematic cross-sectional view, (b) is a schematic side view of the configuration of the first electrode, the second electrode and the fuse element, and (c) is a schematic plan view of the configuration of the first electrode, the second electrode and the fuse element.

FIG. 5 is a series of schematic views of the main components of a protective element according to a second embodiment, wherein (a) is a schematic cross-sectional view, (b) is a schematic side view of the configuration of the first electrode, the second electrode and the fuse element, and (c) is a schematic plan view of the configuration of the first electrode, the second electrode and the fuse element.

Those members using the same symbols as the first embodiment are deemed to have the same configuration, and description of those members is omitted.

Further, even descriptions of members having a different symbol from the first embodiment may sometimes be omitted if the function of the member is the same.

The main point of difference of the protective element according to the second embodiment relative to the protective element according to the first embodiment is the provision of a first electrode and a second electrode at the two end portions of the fuse element.

Specifically, the protective element 200 illustrated in FIG. 5(a) has a first electrode 1 and a second electrode 2, wherein the first electrode 1 is connected to the first end portion 3a of the fuse element 3, and the second electrode 2 is connected to the second end portion 3b of the fuse element 3.

<First Electrode, Second Electrode>

The first electrode 1 and the second electrode 2 are connected electrically to the first end portion 3a and the second end portion 3b respectively of the fuse element 3.

Conventional electrode materials can be used for the first electrode 1 and the second electrode 2, and examples include metals (including alloys), with specific examples including copper, brass, nickel, stainless steel and 42 alloy.

The first electrode 1 and second electrode 2 illustrated in FIG. 5 have an overall rectangular shape when viewed in a plan view, but any shape may be used, provided that the effects of the present invention can be achieved.

The first electrode 1 and the second electrode 2 have an external terminal hole 1a and an external terminal hole 2a respectively.

Of this pair of external terminal holes 1a and 2a, one external terminal hole may be used for connecting to a power source side, and the other external terminal hole may be used for connection to the load side.

There are no particular limitations on the shapes of the external terminal holes 1a and 2a, provided they are capable of engaging with the terminals on the power source side or the load side, which are not shown in the drawing, and although the external terminal holes 1a and 2a illustrated in FIG. 5(c) are through-holes with no exterior openings, claw-like shapes or the like having a partial exterior opening may also be used.

Although there are no particular limitations on the thickness of the first electrode 1 and the second electrode 2, typical values are within a range from 0.05 to 1.0 mm.

The first electrode 1 and the second electrode 2 may each be connected to a metal plate that functions as an external connection terminal that is compatible with large electric currents. The connection may be achieved using conventional methods such as soldering. Similar materials to the first terminal member 5 and the second terminal member 6 described above may be used for these metal plates.

At least one of the first electrode 1 and the second electrode 2 is preferably bonded to the fuse element 3 by soldering, and it is more preferable that both the first electrode 1 and the second electrode 2 are bonded to the fuse element 3 by soldering.

This preference is due to a lowering of the electrical resistance between the first electrode 1 or the second electrode 2 and the fuse element 3.

Conventional materials may be used as the solder material, but from the viewpoints of the resistivity and melting point, a material containing Sn as the main component is preferred.

Third Embodiment

Figure 6:
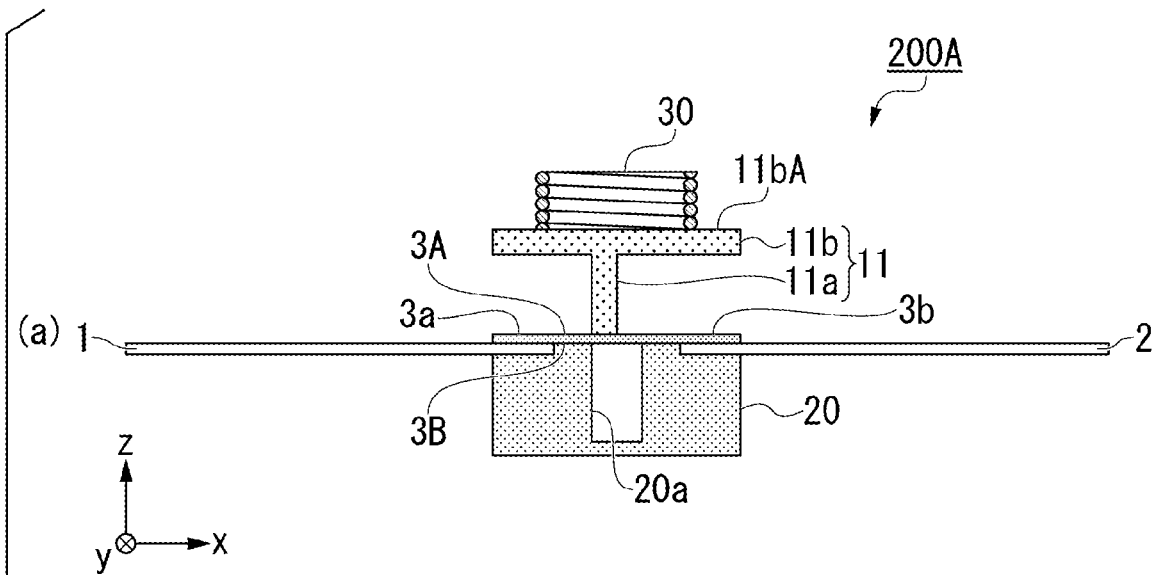
FIG. 6 is a series of schematic views of the main components of a protective element according to a third embodiment, wherein (a) is a schematic cross-sectional view that corresponds with FIGS. 1(a), and (b) is a schematic cross-sectional view that corresponds with FIG. 2(a).
Figure 6:
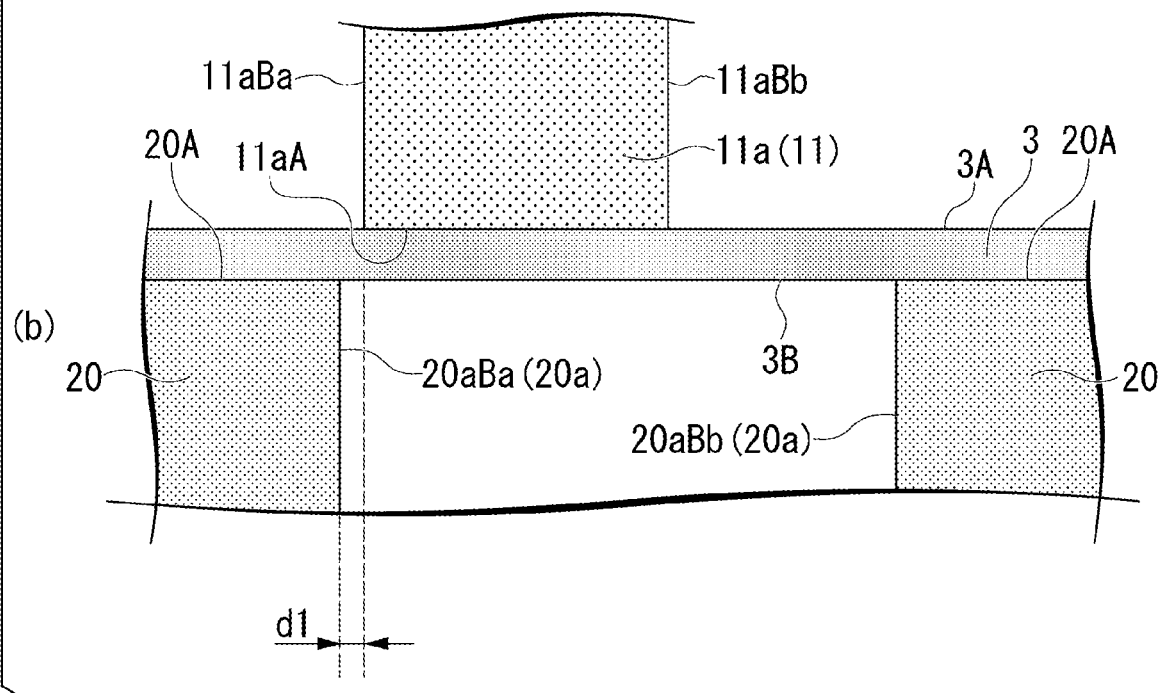

FIG. 6 is a series of schematic views of the main components of a protective element according to a third embodiment, wherein (a) is a schematic cross-sectional view that corresponds with FIGS. 1(a), and (b) is a schematic cross-sectional view that corresponds with FIG. 2(a). Those members using the same symbols as the above embodiments are deemed to have the same configuration, and description of those members is omitted. Further, even descriptions of members having a different symbol from the above embodiments may sometimes be omitted if the function of the member is the same.

The main point of difference of the protective element according to the third embodiment compared with the protective element according to the second embodiment is that among the two sets of opposing outside surfaces and inside surfaces of the protruding portion of the protruding member and the recessed portion of the recessed member, only the surfaces in one set are positioned close to one another.

A modified example of the protective element according to the third embodiment may, in a similar manner to the protective element illustrated in FIG. 1, have a configuration in which the first electrode and the second electrode are not included.

In the protective element 200A illustrated in FIG. 6, among the two sets of opposing surfaces of the protruding portion 11a of the protruding member 11 and the recessed portion 20a of the recessed member 20 along the direction of current flow through the fuse element 3 (the x direction), namely among the outside surface 11aBa and the inside surface 20aBa, and the outside surface 11aBb and the inside surface 20aBb, only in the set of surfaces composed of the outside surface 11aBa and the inside surface 20aBa are the surfaces positioned close to one another when viewed in a plan view from the thickness direction (the z direction).

A spring used as the pressing device 30 is mounted on the upper surface 11bA of the base portion 11b of the protruding member 11, and is held in a compressed state.

In the protective element according to the third embodiment, when viewed in a plan view from the thickness direction (the z direction), the shearing action that slices the fuse element 3 is strengthened near the outside surface 11aBa and the inside surface 20aBa.

In contrast, in the protective elements according to the first embodiment and the second embodiment, when viewed in a plan view from the thickness direction (the z direction), the shearing action that slices the fuse element 3 is strengthened in two locations, near the outside surface 10aBa and the inside surface 20aBa, and near the outside surface 10aBb and the inside surface 20aBb. In the protective elements according to the first embodiment and the second embodiment, although there are two locations at which the shearing action is strengthened, actual cutoff tests revealed that cutting occurred at only one of the two locations.

It is thought that this is because once cutting proceeds at one location, the shearing force acting at the other location is dispersed.

Further, by limiting the number of shearing regions to one location from the start, the strength of the spring that functions as the pressing device 30 can be lowered, and as a result, the case 60 can be simplified and the spring can be reduced in size, meaning the cost of the members can be reduced.

A notch that facilitates cutoff may be inserted in the fuse element 3 in a location where the shearing force acts forcefully when viewed in a plan view from the thickness direction (the z direction).

Fourth Embodiment

Figure 7:
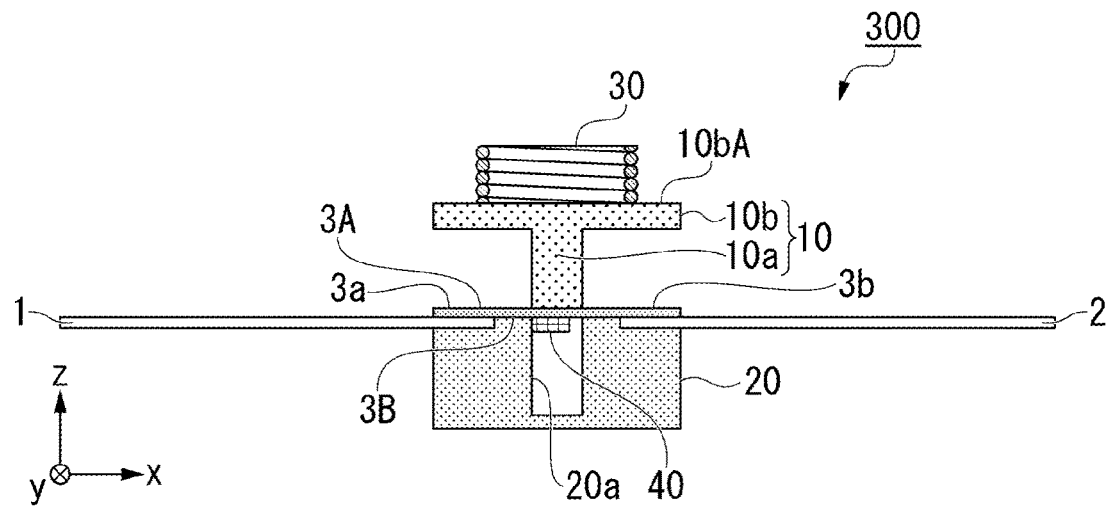
FIG. 7 is a schematic view of the main components of a protective element according to a fourth embodiment, and is a schematic cross-sectional view that corresponds with FIG. 1(a).

FIG. 7 is a schematic view of the main components of a protective element according to a fourth embodiment, and is a schematic cross-sectional view that corresponds with FIG. 1(a). Those members using the same symbols as the above embodiments are deemed to have the same configuration, and description of those members is omitted. Further, even descriptions of members having a different symbol from the above embodiments may sometimes be omitted if the function of the member is the same.

The point of difference of the protective element according to the fourth embodiment compared with the protective element according to the third embodiment is that a heating element that can heat the fuse element is provided in electrical contact with the fuse element.

Specifically, in the protective element 300 illustrated in FIG. 7, a heating element 40 that heats the fuse element 3 is provided in contact with the fuse element 3 in a position near the protruding member 10.

Figure 8:
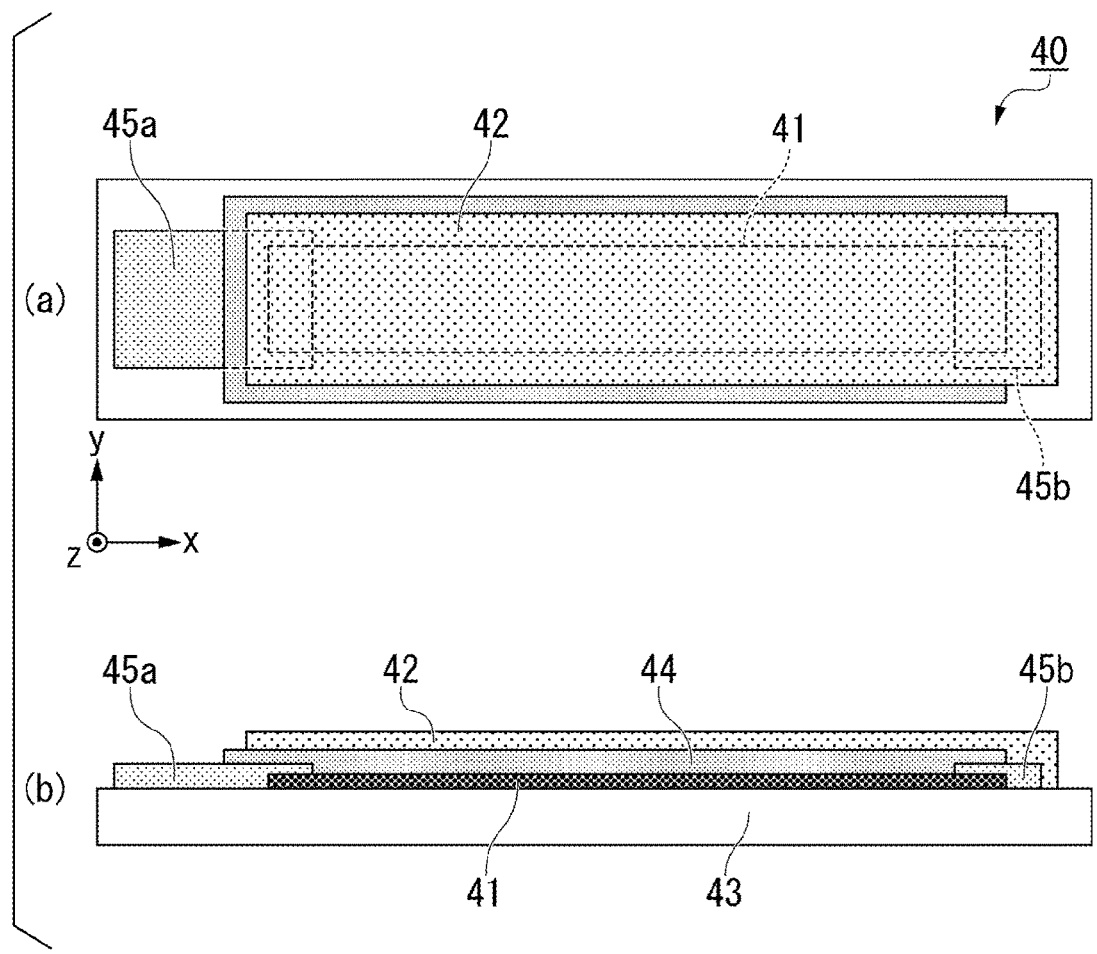
FIG. 8 is a series of schematic views of the configuration of one example of a heating element 40, wherein (a) is a schematic plan view viewed from the z direction, and (b) is a schematic cross-sectional view.

FIG. 8 is a series of schematic views of the configuration of one example of the heating element 40, wherein (a) is a schematic plan view viewed from the z direction, and (b) is a schematic cross-sectional view.

The heating element 40 has a heat-generating body 41, and further has an electrode layer 42 electrically connected to the heat-generating body 41 on a surface of the heating element 3 on a fuse element side.

The heating element 40 is also provided with an insulating substrate 43 on which the heat-generating body 41 is formed, an insulating layer 44 that covers the heat-generating body 41, and heat-generating body electrodes 45a and 45b formed at the two ends of the insulating substrate 43.

The heat-generating body 41 is formed from a material having conductivity that generates heat upon current flow, such as nichrome, W, Mo or Ru or the like, or a material containing one of these metals. The heat-generating body 41 is formed by mixing a powder of one of these alloys or a composition or compound thereof with a resin binder or the like, using the resulting paste to form a pattern on the insulating substrate 43 using a screen printing technique, and then firing the resulting structure.

The insulating substrate 43 is a substrate having insulating properties, such as alumina, glass ceramic, mullite or zirconia.

The insulating layer 44 is provided to protect and insulate the heat-generating body 41, as well as facilitating the efficient transfer of the heat generated by the heat-generating body 41 to the fuse element 3.

In the protective element 300 illustrated in FIG. 7, the heat-generating body 41 is connected to the fuse element 3 via the electrode layer 42.

In the protective element 300 illustrated in FIG. 7, when an anomaly occurs in the external circuit that represents the current path for the protective element, by heating the heating element 40, the fuse element rapidly reaches the softening temperature or higher, enabling the fuse element 3 to be cut.

When the current path of the external circuit requires cutting, the heat-generating body 41 can be activated by a current control element provided in the external circuit.

In a state where a current exceeding the rated current flows through the fuse element 3, or a state where the heat-generating body 41 has been activated, the fuse element 3 is heated to a temperature equal to or higher than the softening temperature, and the fuse element is cut. By cutting the fuse element 3, the current path through the external circuit is cut off, and energy supply to the heat-generating body 41 is also cut.

The width of the heating element 40 in the lengthwise direction of the fuse element 3 and the positioning of the heating element 40 affect the cutting location of the fuse element 3. In order to concentrate the pressing force applied by the protruding member, the width of the heating element 40 in the lengthwise direction of the fuse element 3 is typically smaller than the width of the protruding portion 10a, and the heating element 40 is positioned against one of the inside surfaces of the recessed portion of the recessed member.

Figure 9:
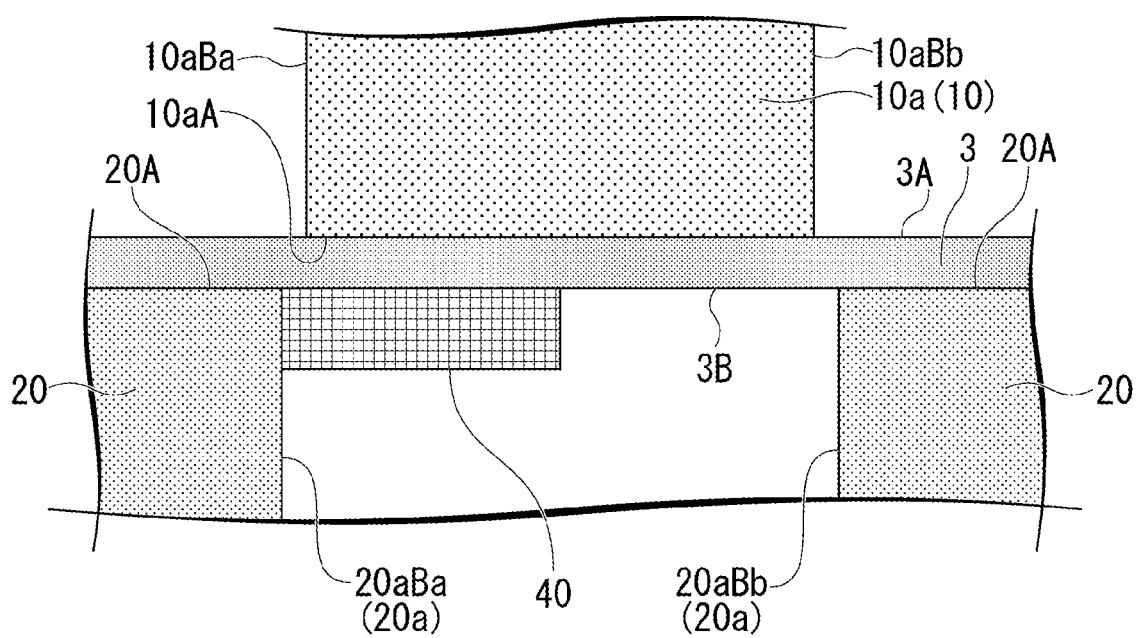
FIG. 9 is an enlarged schematic view illustrating the position in which the heating element 40 is located in the protective element illustrated in FIG. 7.

Specifically, as illustrated in FIG. 9, among the two locations in the vicinity of the outside surface 10aBa and the inside surface 20aBa, and in the vicinity of the outside surface 10aBb and the inside surface 20aBb, when it is desirable to promote cutoff in the vicinity of the outside surface 10aBa and the inside surface 20aBa, the heating element 40 is positioned toward the side of the inside surface 20aBa.

In the protective element 300 illustrated in FIG. 7, the heating element 40 is provided on the surface 3B of the fuse element 3 on the side of the recessed member 20, but the heating element 40 may also be provided on the surface 3A on the side of the protruding member 10.

In the protective element 300 illustrated in FIG. 7, the side surfaces of the heating element 40, the outside surfaces of the protruding portion 10 and the inside surfaces of the recessed portion 20 are preferably electrically insulated.

Figure 10:
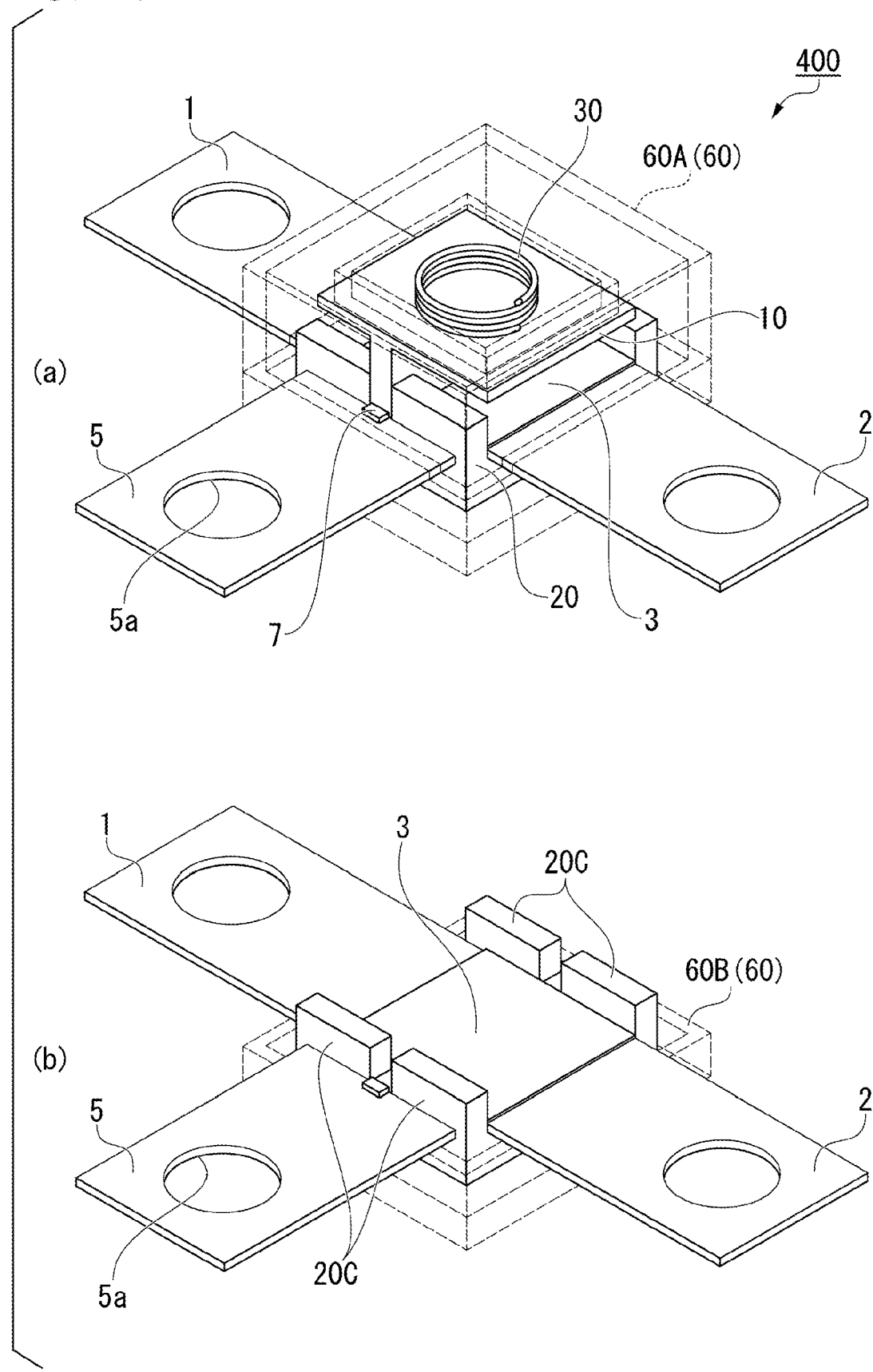
FIG. 10 illustrates one example of the use of a protective element, and is a series of schematic views illustrating the configuration in one example where the protective element 300 illustrated in FIG. 7 is used, wherein (a) is a schematic perspective view of the entire structure, and (b) is a schematic perspective view of only the lower portion of the structure.
Figure 11:
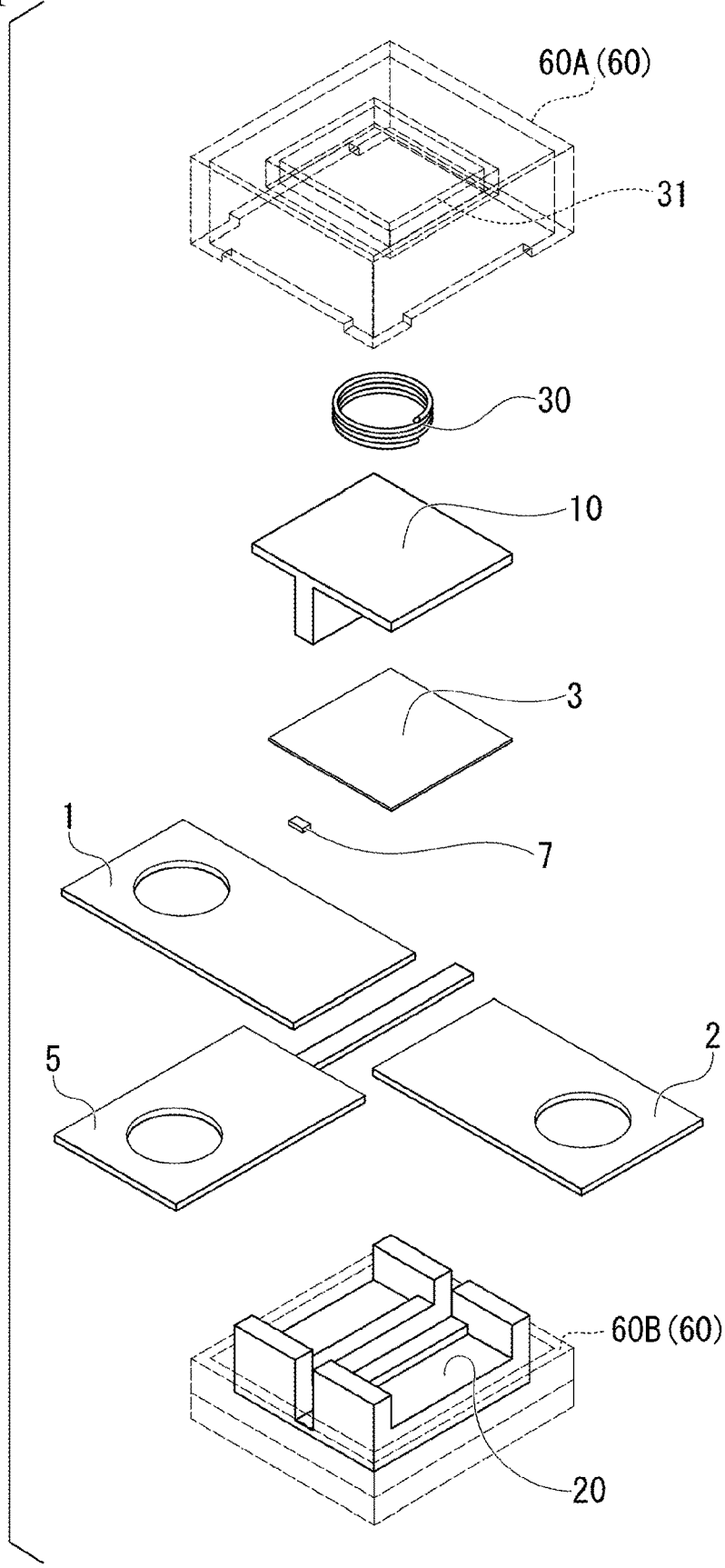
FIG. 11 is an exploded schematic perspective view of the protective element illustrated in FIG. 10.

FIG. 10 illustrates one example of the use of the protective element described above, and is a series of schematic views illustrating the configuration in one example where the protective element 300 illustrated in FIG. 7 is used, wherein (a) is a schematic perspective view of the entire structure, and (b) is a schematic perspective view of only the lower portion of the structure. Further, FIG. 11 is an exploded schematic perspective view of the protective element illustrated in FIG. 10.

The protective element 400 illustrated in FIG. 10 includes, in addition to the members illustrated in FIG. 7, mainly, a third electrode 5 that supplies current to the heating element 40, guides 20C which are provided in the recessed member 20 and guide the protruding portion 10a of the protruding member 10 into the recessed portion 20a, and a case 60 (composed of an upper case 60A and a lower case 60B). Further, a holding frame that holds the spring member 30 on the upper surface 10bA of the base portion 10b of the protruding member 10 is installed inside the case 60.

The third electrode 5 is connected electrically to the heat-generating body electrode 45a of the heating element 40 via a connecting conductor 7.

The case 60 can be formed from a material having insulating properties, such as an engineering plastic, alumina, glass ceramic, mullite or zirconia.

The case 60 is preferably formed from a ceramic material having a high level of thermal conductivity such as alumina. The heat generated by an overcurrent through the fuse element can then be efficiently radiated externally, and the fuse element that is supported in mid-air can be heated and melted locally.

FIG. 12(a) is a schematic cross-sectional view of a configuration in which the protective element 200A illustrated in FIG. 6 is further provided with a heating element that is connected electrically to the fuse element and is capable of heating the fuse element.

Specifically, when viewed in a plan view from the thickness direction (the z direction), the protective element 500 illustrated in FIG. 12(a) includes a heating element 40 for heating the fuse element 3 in a position on the fuse element 3 that overlaps with the protruding portion 10a.

FIG. 12(b) is a schematic cross-sectional view following cutting of the fuse element illustrated in FIG. 12(a).

Figure 12:
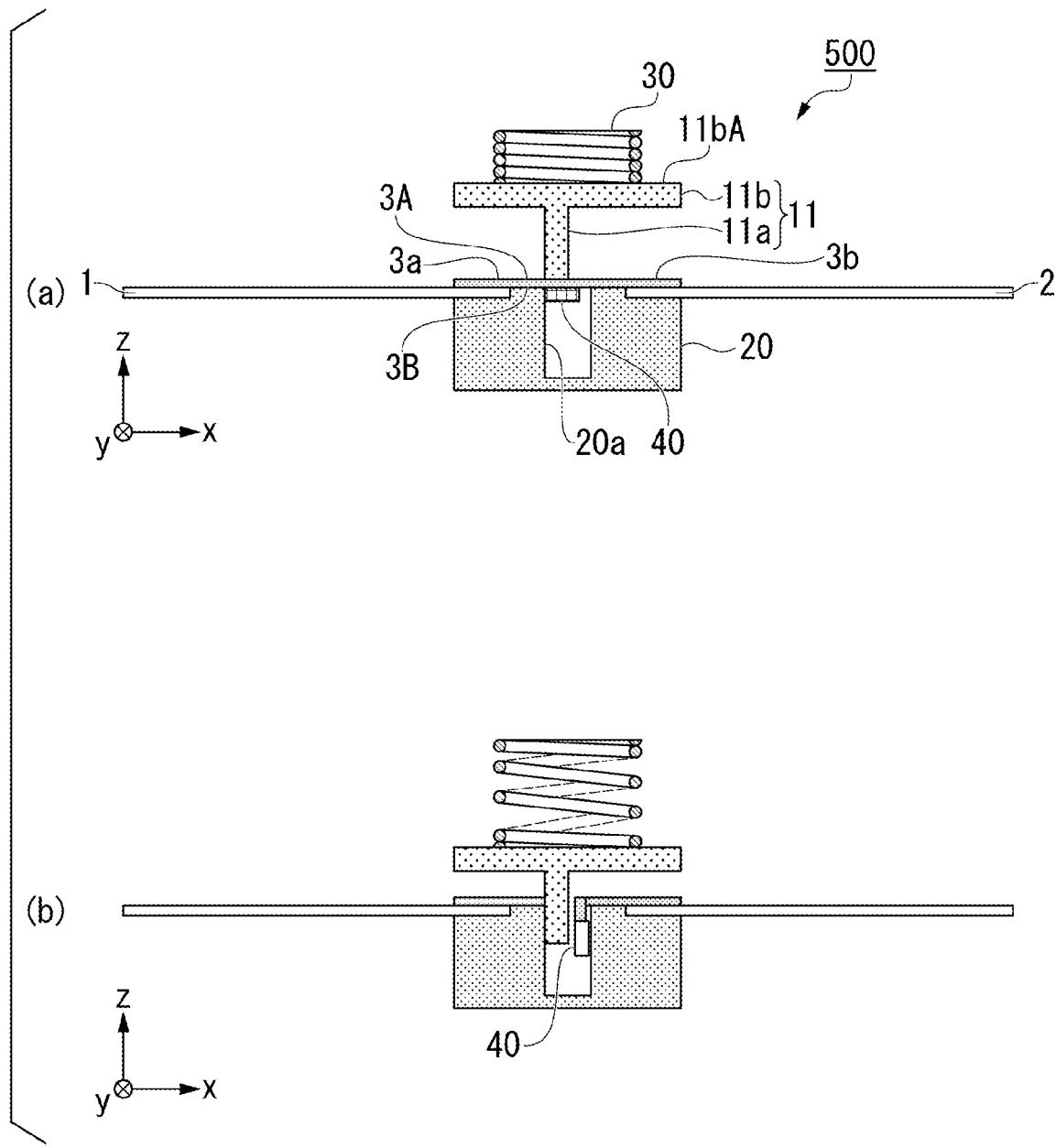
FIG. 12(a) is a schematic cross-sectional view of the protective element 200A illustrated in FIG. 6, further provided with a heating element that is connected electrically to the fuse element and is capable of heating the fuse element, and (b) is a schematic cross-sectional view following cutting of the fuse element illustrated in (a).

In the protective element 500 illustrated in FIG. 12, the heating element 40 is provided on the surface 3B of the fuse element 3 on the side of the recessed member 20, but the heating element 40 may also be provided on the surface 3A on the side of the protruding member 10.

Fifth Embodiment

Figure 13:
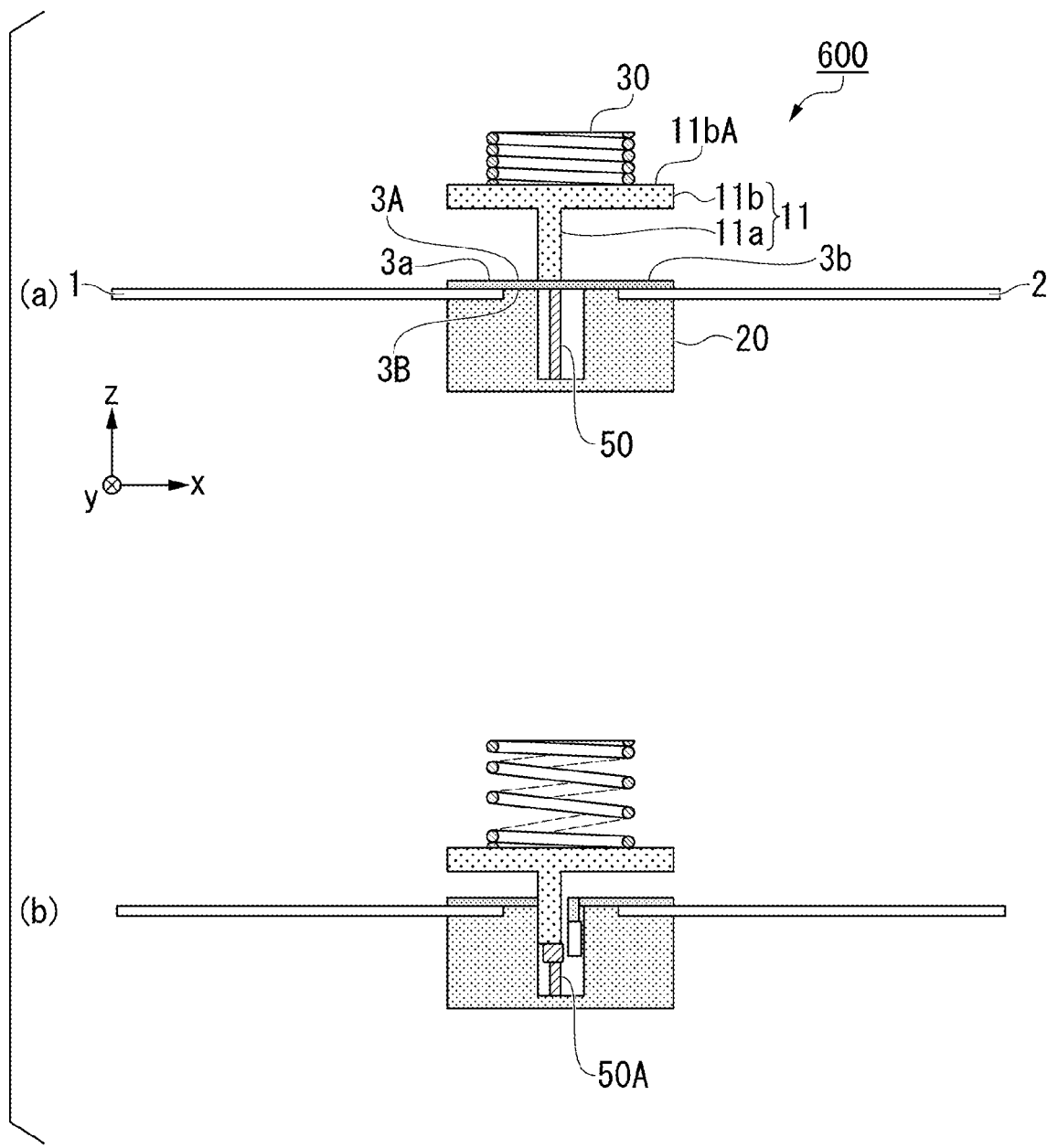
FIG. 13(a) is a schematic cross-sectional view of the main components of a protective element according to a fifth embodiment, and (b) is a schematic cross-sectional view following cutting of the fuse element illustrated in (a).

FIG. 13(a) is a schematic cross-sectional view of the main components of a protective element according to a fifth embodiment.

Those members using the same symbols as the above embodiments are deemed to have the same configuration, and description of those members is omitted. Further, even descriptions of members having a different symbol from the above embodiments may sometimes be omitted if the function of the member is the same.

The point of difference of the protective element according to the fifth embodiment compared with the protective element according to the third embodiment is the inclusion of a support member, which is positioned inside the recessed portion of the recessed member, supports the fuse element from beneath either directly or indirectly, and is formed from a material that suppresses deformation of the fuse element at temperatures no higher than the temperature during rated current flow through the fuse element, but deforms under the force of the pressing device and allows cutting of the fuse element at temperatures equal to or higher than the solidus temperature of the material that constitutes the fuse element.

By including this support member, the shearing load on the fuse element can be reduced at temperatures no higher than the temperature during rated current flow through the fuse element.

Specifically, the protective element 600 illustrated in FIG. 13(a) includes a support member 50, which is positioned inside the recessed portion 20a of the recessed member 20, supports the fuse element 3 directly from beneath, suppresses deformation of the fuse element 3 at temperatures no higher than the temperature during rated current flow through the fuse element 3, but deforms under the force of the pressing device 30 and allows cutting of the fuse element 3 at temperatures equal to or higher than the solidus temperature of the material that constitutes the fuse element 3.

In FIG. 13(a), the support member 50 supports the fuse element 3 through direct contact, but may also support the fuse element 3 indirectly via a layer.

Examples of materials that may be used for the support member 50 include ABS, POM, PC, and PA and the like having a thermal deformation temperature of about 100 to 150° C.

FIG. 13(b) is a schematic cross-sectional view following cutting of the fuse element illustrated in FIG. 13(a).

When the fuse element is cut, the support member 50 deforms under the force of the pressing device 30, as illustrated by the symbol 50A.

Figure 14:
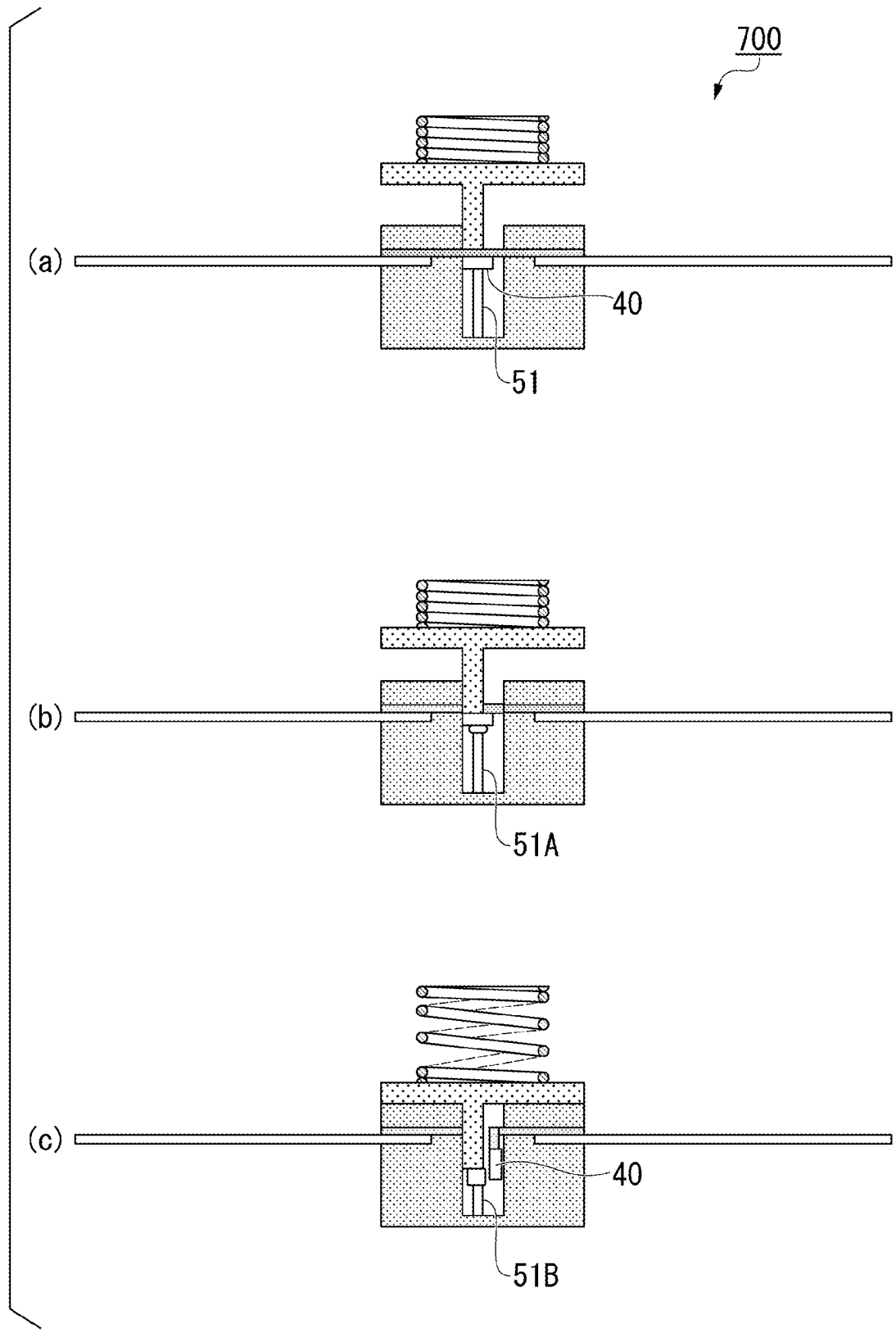
FIG. 14(a) is a schematic cross-sectional view of a configuration in which a support member supports the fuse element from beneath indirectly with a heating element disposed therebetween, (b) is a schematic cross-sectional view illustrating a state where current flow through the heat-generating body has started, and the support member has deformed under the force of the pressing device, and (c) is a schematic cross-sectional view following cutting of the fuse element illustrated in (a).

FIG. 14(a) is a configuration which, when compared with the protective element 600 illustrated in FIG. 13(a), differs in terms of the inclusion of a heating element 40, wherein a support member 51 supports the fuse element 3 indirectly from beneath via the heating element 40.

In the protective element 700 illustrated in FIG. 14(a), when it is necessary to cut current flow through the external circuit, current flow to the heat-generating body 41 is started by a current control element provided in the external circuit, and the support member 51 deforms under the force of the pressing device 30 as illustrated by the support member 51A (see FIG. 14(b)). Moreover, as deformation of the support member 51A proceeds, the fuse element 3 softens due to the heat from the heat-generating body 41, and when a temperature equal to or higher than the softening temperature of the fuse element is reached, the protruding portion 10a cuts through the fuse element 3 (see FIG. 14(c)). By cutting the fuse element 3, the current path through the external circuit is cut off, and energy supply to the heat-generating body 41 is also cut.

Sixth Embodiment

Figure 15:
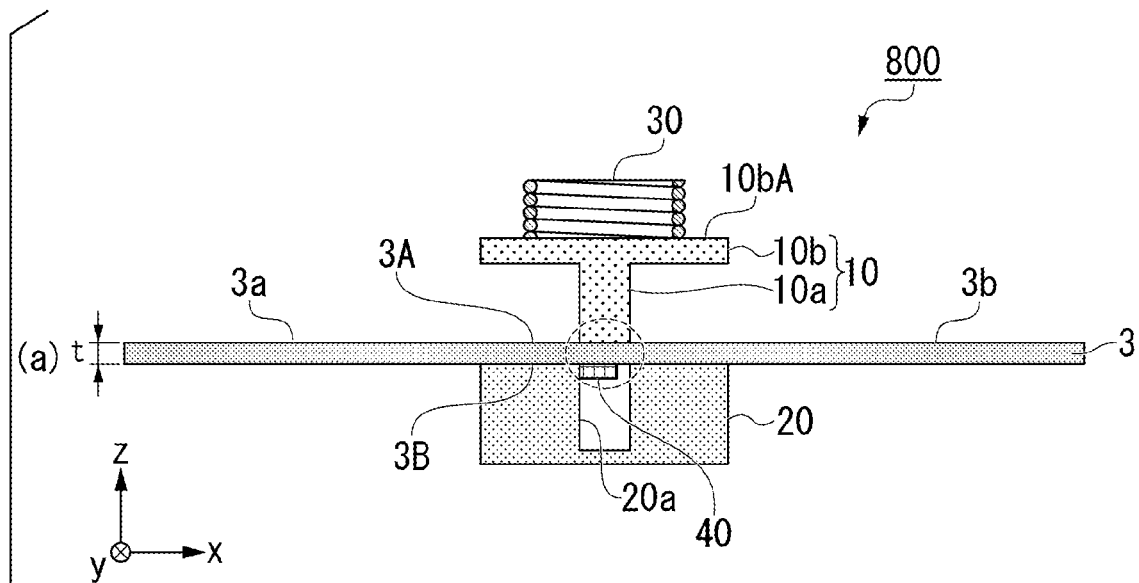
FIG. 15 is a series of schematic views of the main components of a protective element according to a sixth embodiment, wherein (a) is a schematic cross-sectional view, and (b) is an enlarged view of the location circled with a dotted line in (a).
Figure 15:
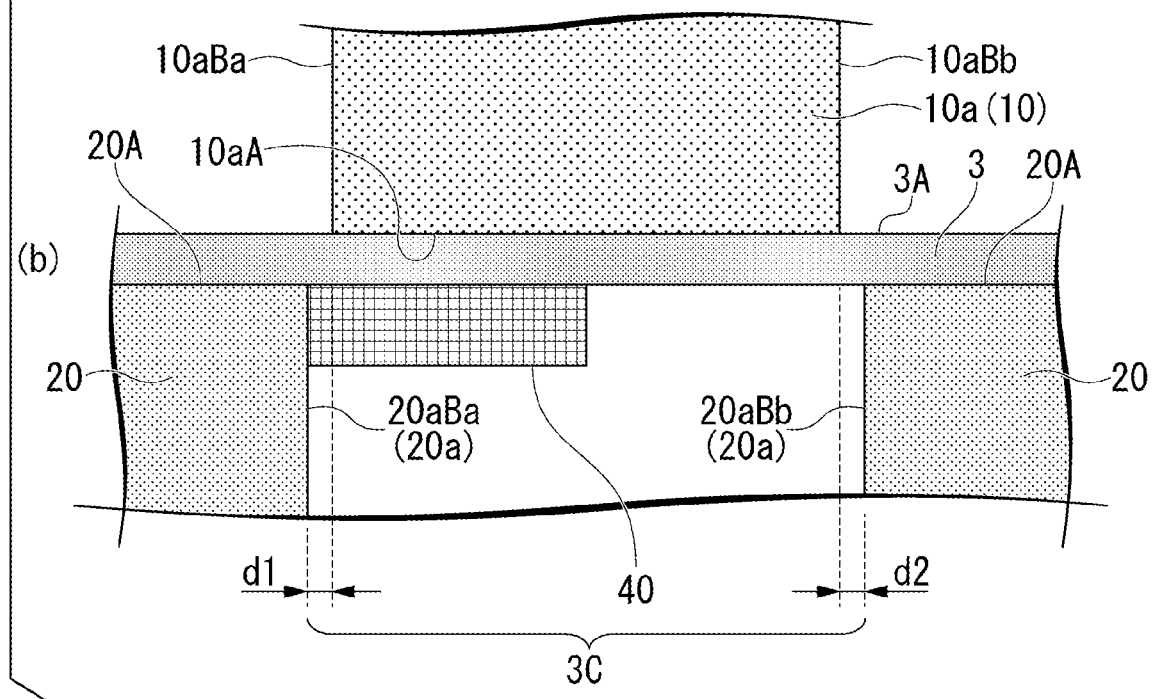

FIG. 15 is a series of schematic views of the main components of a protective element according to a sixth embodiment, wherein (a) is a schematic cross-sectional view, and (b) is an enlarged view of the location circled with a dotted line in (a). Those members using the same symbols as the above embodiments are deemed to have the same configuration, and description of those members is omitted. Further, even descriptions of members having a different symbol from the above embodiments may sometimes be omitted if the function of the member is the same.

The main point of difference of the protective element according to the sixth embodiment relative to the protective element according to the first embodiment is the provision of a heating element that heats and melts the fuse element in a position near the protruding portion and in contact with the fuse element.

The protective element 800 illustrated in FIG. 15(a) includes a fuse element 3 having a first end portion 3a and a second end portion 3b, in which current flows from the first end portion 3a toward the second end portion 3b, a protruding member 10 and a recessed member 20 that are positioned opposing one another so as to sandwich a cutoff portion 3C of the fuse element 3 positioned between the first end portion 3a and the second end portion 3b, and a pressing device 30 that imparts an elastic force that shortens the relative distance in a first direction (the z direction) that represents the direction in which the protruding member 10 and the recessed member 20 sandwich the cutoff portion 3C, wherein at least one pair of opposing surfaces of a protruding portion 10a of the protruding member 10 and a recessed portion 20a of the recessed member 20 that intersect the direction of current flow (the x direction) through the fuse element 3 (namely, at least one pair of opposing surfaces among an outside surface 10aBa and an inside surface 20aBa, and an outside surface 10aBb and an inside surface 20aBb) are positioned close to one another when viewed in a plan view from the first direction (the z direction), a heating element 40 that heats and melts the fuse element 3 is provided in contact with the fuse element 3 in a position near the protruding portion 10, and the fuse element 3 is cut by heating the heating element 40.

In the protective element according to the sixth embodiment, the fuse element 3 can be melted and cut by heating the heating element 40, and the protruding member 10, the recessed member 20 and the pressing device 30 function as a supplementary device for cutting the fuse element 3.

Modified Example

Figure 16:
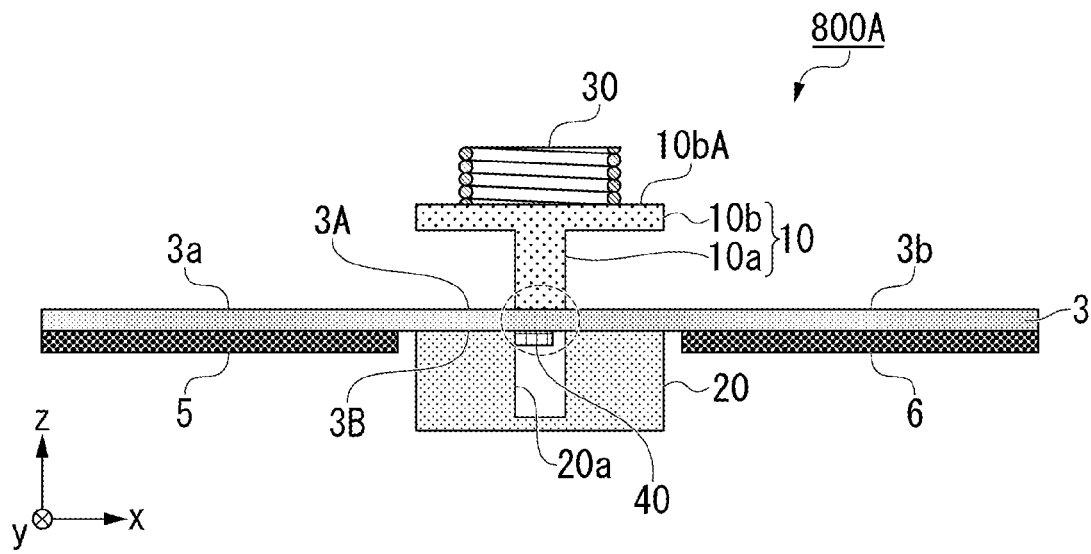
FIG. 16 is a schematic cross-sectional view of a modified example of the protective element according to the sixth embodiment.

FIG. 16 is a schematic cross-sectional view of a modified example of the protective element according to the sixth embodiment. Those members using the same symbols as the above embodiments are deemed to have the same configuration, and description of those members is omitted. Further, even descriptions of members having a different symbol from the above embodiments may sometimes be omitted if the function of the member is the same.
<First Terminal Member, Second Terminal Member>

In the protective element 800A illustrated in FIG. 16, the main points of difference are that a first terminal member 5 is connected so as to overlap in the thickness direction with the first end portion 3a of the fuse element 3, and a second terminal member 6 is connected so as to overlap in the thickness direction with the second end portion 3b.

Seventh Embodiment

Figure 17:
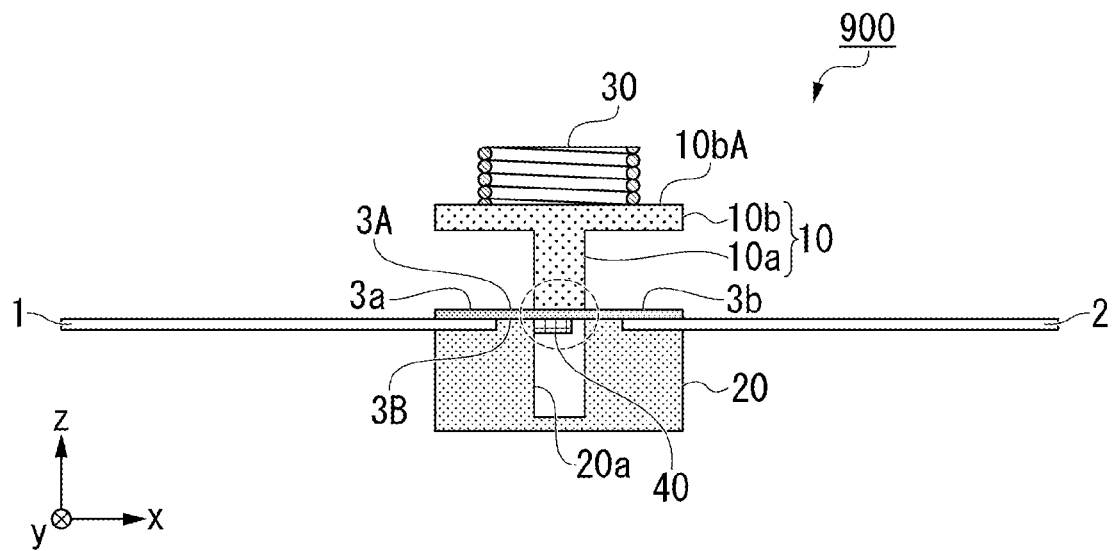
FIG. 17 is a schematic cross-sectional view of the main components of a protective element according to a seventh embodiment.

FIG. 17 is a schematic cross-sectional view of the main components of a protective element according to a seventh embodiment. Those members using the same symbols as the above embodiments are deemed to have the same configuration, and description of those members is omitted. Further, even descriptions of members having a different symbol from the above embodiments may sometimes be omitted if the function of the member is the same.

The main point of difference of the protective element according to the seventh embodiment relative to the protective element according to the sixth embodiment is the provision of a first electrode and a second electrode on the two end portions of the fuse element.

Specifically, the protective element 900 illustrated in FIG. 17 has a first electrode 1 and a second electrode 2, wherein the first electrode 1 is connected to the first end portion 3a of the fuse element 3, and the second electrode 2 is connected to the second end portion 3b of the fuse element 3.

The fuse element 3 that has melted under the heating of the heating element 40 is sandwiched between and cut by the protruding member 10 and the recessed member 20 as a result of the stress applied by the pressing device 30.

Eighth Embodiment

Figure 18:
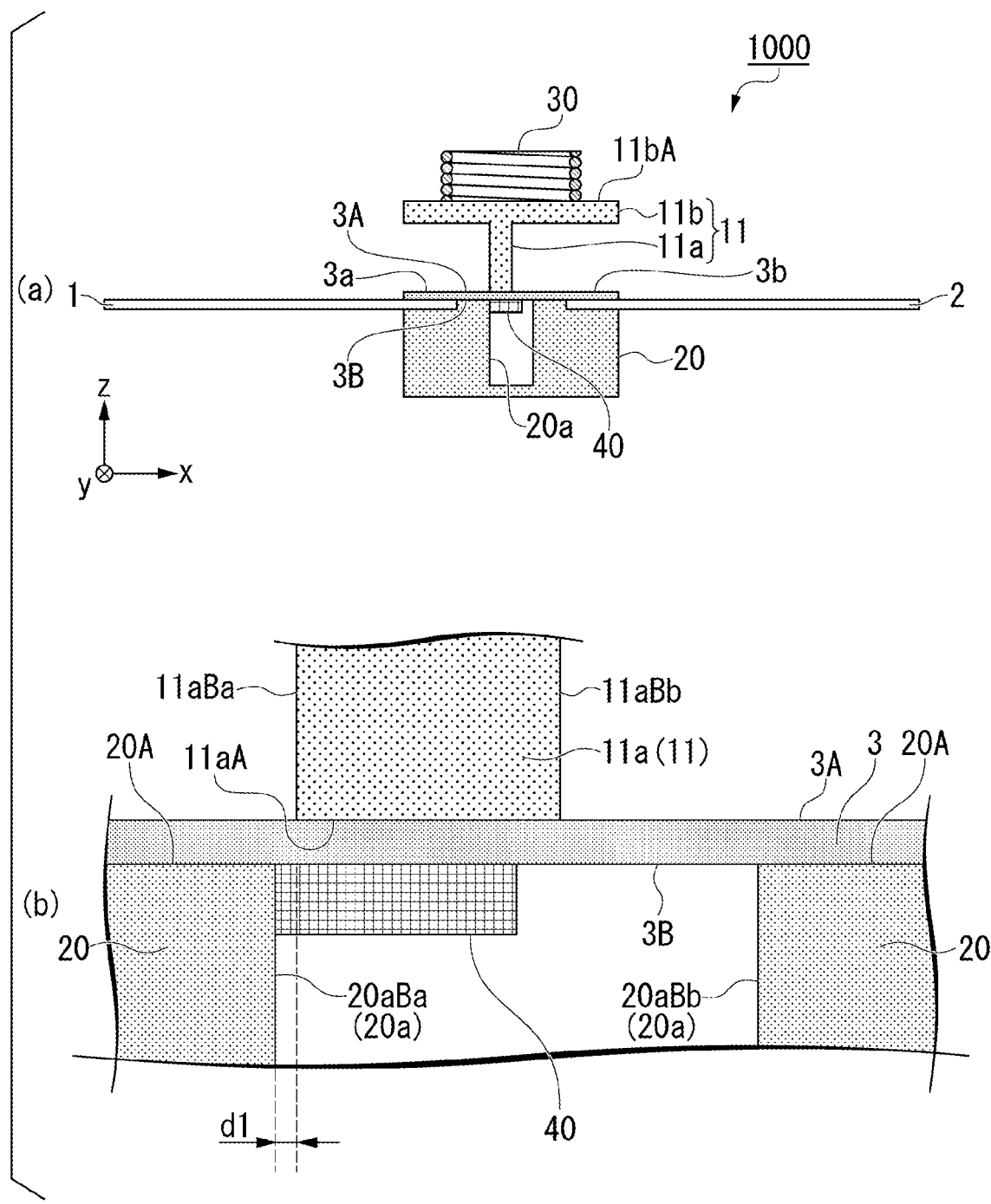
FIG. 18 is a series of schematic views of the main components of a protective element according to a eighth embodiment, wherein (a) is a schematic cross-sectional view that corresponds with FIGS. 15(a), and (b) is a schematic cross-sectional view that corresponds with FIG. 15(b).

FIG. 18 is a series of schematic views of the main components of a protective element according to a eighth embodiment, wherein (a) is a schematic cross-sectional view that corresponds with FIGS. 15(a), and (b) is a schematic cross-sectional view (enlarged view) that corresponds with FIG. 15(b). Those members using the same symbols as the above embodiments are deemed to have the same configuration, and description of those members is omitted. Further, even descriptions of members having a different symbol from the above embodiments may sometimes be omitted if the function of the member is the same.

The point of difference of the protective element according to the eighth embodiment compared with the protective element according to the sixth embodiment is that among the two sets of opposing outside surfaces and inside surfaces of the protruding portion of the protruding member and the recessed portion of the recessed member, only the surfaces in one set are positioned close to one another.

In the protective element 1000 illustrated in FIG. 18, among the two sets of opposing surfaces of the protruding portion 11a of the protruding member 11 and the recessed portion 20a of the recessed member 20 along the direction of current flow through the fuse element 3 (the x direction), namely among the outside surface 11aBa and the inside surface 20aBa, and the outside surface 11aBb and the inside surface 20aBb, only in the set of surfaces composed of the outside surface 11aBa and the inside surface 20aBa are the surfaces positioned close to one another when viewed in a plan view from the thickness direction (the z direction).

A spring used as the pressing device 30 is mounted on the upper surface 11bA of the base portion 11b of the protruding member 11, and is held in a compressed state.

Ninth Embodiment

Figure 19:
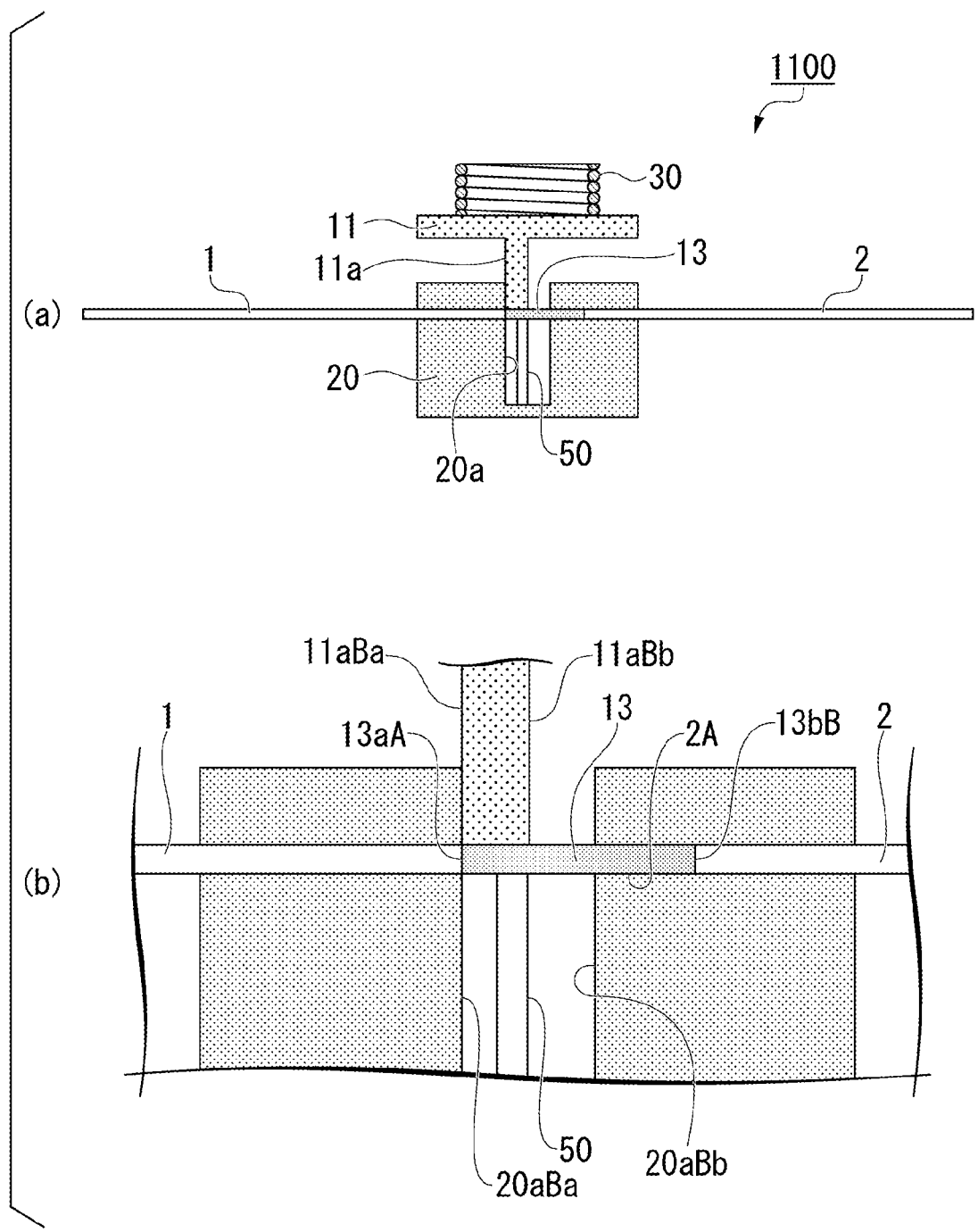
FIG. 19 is a series of schematic views of the main components of a protective element according to a ninth embodiment, wherein (a) is a schematic cross-sectional view that corresponds with FIGS. 18(a), and (b) is a schematic cross-sectional view that corresponds with FIG. 18(b).

FIG. 19 is a series of schematic views of the main components of a protective element according to a ninth embodiment, wherein (a) is a schematic cross-sectional view that corresponds with FIGS. 18(a), and (b) is a schematic cross-sectional view (enlarged view) that corresponds with FIG. 18(b). Those members using the same symbols as the above embodiments are deemed to have the same configuration, and description of those members is omitted. Further, even descriptions of members having a different symbol from the above embodiments may sometimes be omitted if the function of the member is the same.

The point of difference of the protective element according to the ninth embodiment compared with the protective element according to the eighth embodiment is that the two end surfaces of the fuse element are soldered to the first electrode and the second electrode respectively, and one end surface among the two end surfaces of the fuse element is positioned inside the opening of the recessed portion when viewed in a plan view from the first direction (the z direction).

The protective element 1100 illustrated in FIG. 19 includes a first electrode 1 and a second electrode 2, a fuse element 13 connected by a solder at both end surfaces 13aA and 13bB to the first electrode 1 and the second electrode 2 respectively, a protruding member 11 and a recessed member 20 that are positioned opposing one another so as to sandwich the fuse element 13, and a pressing device 30 that imparts an elastic force that shortens the relative distance in a first direction (the z direction) that represents the direction in which the protruding member 11 and the recessed member 20 sandwich the fuse element 13, wherein one pair of opposing surfaces of a protruding portion 11a of the protruding member 11 and a recessed portion 20a of the recessed member 20 that intersect the direction of current flow through the fuse element 13 (namely, the outside surface 11aBa and the inside surface 20aBa) are positioned close to one another when viewed in a plan view from the first direction (the z direction), one end surface 13aA of the fuse element 13 that is connected to the first electrode 1 is positioned inside the opening of the recessed portion 20 when viewed in a plan view from the first direction (the z direction), and the connection between the end surface 13aA and the first electrode 1 is cut at a temperature equal to or higher than the softening temperature of the metal material that constitutes the solder.

The protective element 1100 illustrated in FIG. 19 includes a support member 50, which is positioned inside the recessed portion 20a of the recessed member 20, supports the fuse element 13 directly from beneath, suppresses deformation of the fuse element 13 at temperatures no higher than the temperature during rated current flow through the fuse element 3, but deforms under the force of the pressing device 30 and allows cutting of the fuse element 13 at temperatures equal to or higher than the solidus temperature of the material that constitutes the fuse element 3. Including the support member 50 is able to reduce the shearing load on the fuse element 13.

Tenth Embodiment

Figure 20:
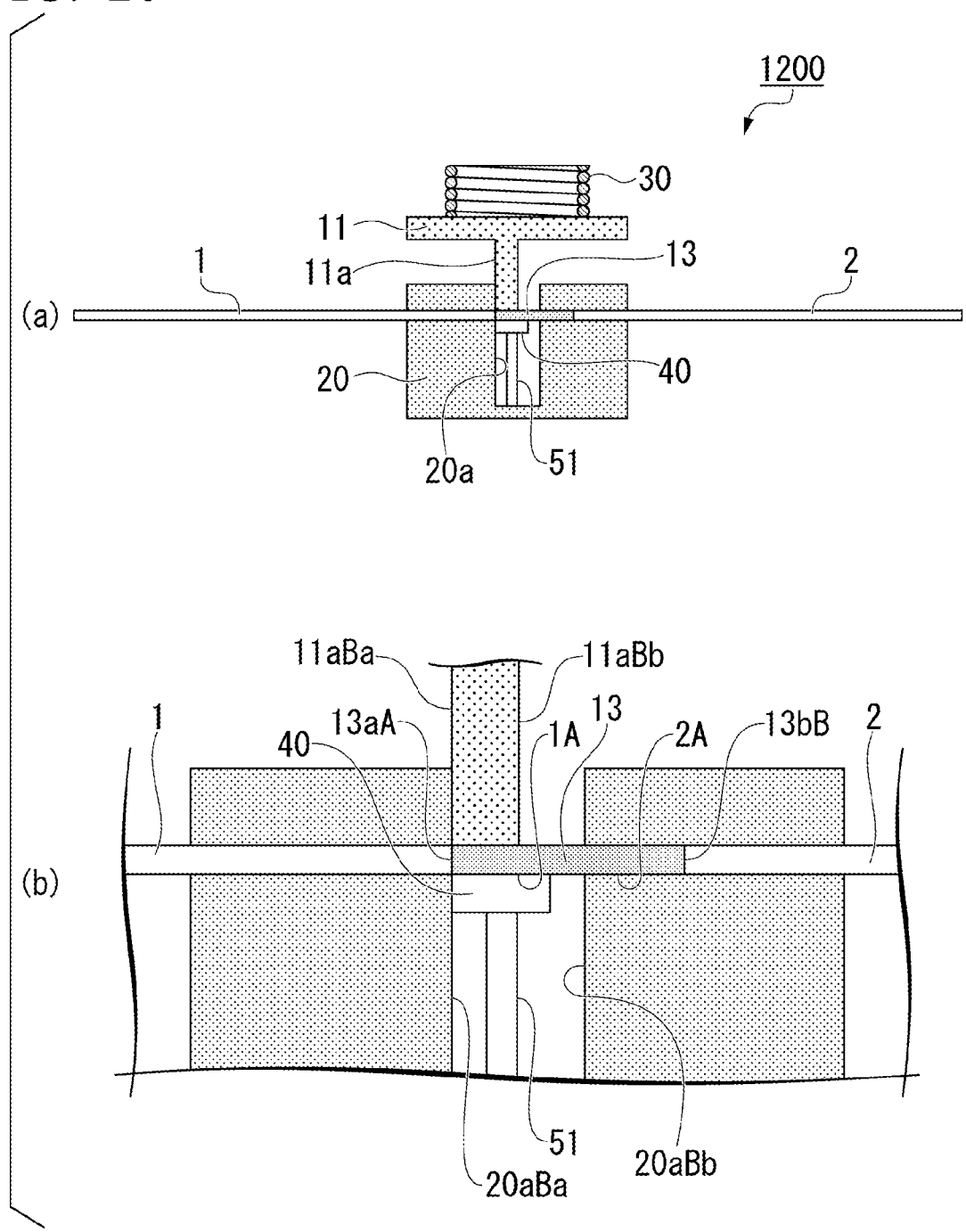
FIG. 20 is a series of schematic views of the main components of a protective element according to a tenth embodiment, wherein (a) is a schematic cross-sectional view that corresponds with FIGS. 19(a), and (b) is a schematic cross-sectional view that corresponds with FIG. 19(b).

FIG. 20 is a series of schematic views of the main components of a protective element according to a tenth embodiment, wherein (a) is a schematic cross-sectional view that corresponds with FIGS. 19(a), and (b) is a schematic cross-sectional view (enlarged view) that corresponds with FIG. 19(b).

Those members using the same symbols as the above embodiments are deemed to have the same configuration, and description of those members is omitted.

Further, even descriptions of members having a different symbol from the above embodiments may sometimes be omitted if the function of the member is the same.

The point of difference of the protective element according to the tenth embodiment compared with the protective element according to the ninth embodiment is the inclusion of a heating element that is connected electrically to the fuse element, and heats and melts the fuse element.

The protective element 1200 illustrated in FIG. 20 includes a first electrode 1 and a second electrode 2, a fuse element 13 connected by a solder at both end surfaces 13aA and 13bB to the first electrode 1 and the second electrode 2 respectively, a protruding member 11 and a recessed member 20 that are positioned opposing one another so as to sandwich the fuse element 13, and a pressing device 30 that imparts an elastic force that shortens the relative distance in a first direction (the z direction) that represents the direction in which the protruding member 11 and the recessed member 20 sandwich the fuse element 13, wherein one pair of opposing surfaces of a protruding portion 11a of the protruding member 11 and a recessed portion 20a of the recessed member 20 that intersect the direction of current flow through the fuse element 13 (namely, the outside surface 11aBa and the inside surface 20aBa) are positioned close to one another when viewed in a plan view from the first direction (the z direction), the end surface 13aA of the fuse element 13 that is connected to the first electrode 1 is positioned inside the opening of the recessed portion 20 when viewed in a plan view from the first direction (the z direction), a heating element 40 that heats and melts the fuse element 13 is provided in contact with the fuse element 13 in a position near the protruding portion 10, and the connection between the end surface 13aA and the first electrode 1 is cut by heating the heating element 40.

The protective element 1200 illustrated in FIG. 20 also includes a support member 51, which is positioned inside the recessed portion 20a of the recessed member 20, supports the fuse element 13 directly from beneath, suppresses deformation of the fuse element 13 at temperatures no higher than the temperature during rated current flow through the fuse element 13, but deforms under the force of the pressing device 30 and allows cutting of the fuse element 13 at temperatures equal to or higher than the solidus temperature of the material that constitutes the fuse element 13. Including the support member 51 is able to reduce the shearing load on the fuse element 13 at temperatures no higher than the temperature during rated current flow through the fuse element 13.

The point of difference of the protective element 1200 illustrated in FIG. 20 compared with the protective element 1100 illustrated in FIG. 19 is that the support member 51 supports the fuse element 13 from beneath indirectly with the heating element 40 disposed therebetween.

Eleventh Embodiment

Figure 21:
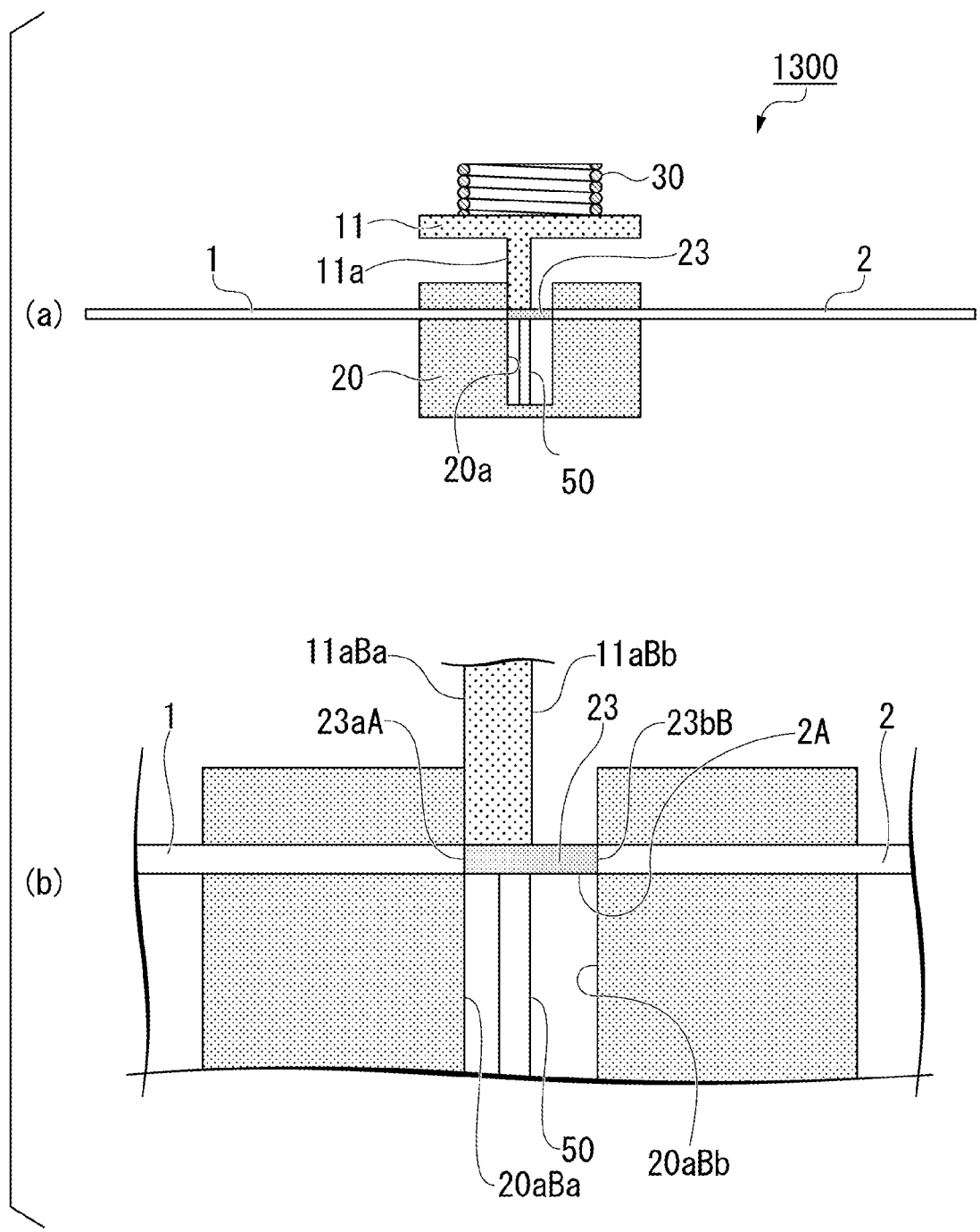
FIG. 21 is a series of schematic views of the main components of a protective element according to an eleventh embodiment, wherein (a) is a schematic cross-sectional view that corresponds with FIGS. 19(a), and (b) is a schematic cross-sectional view that corresponds with FIG. 19(b).

FIG. 21 is a series of schematic views of the main components of a protective element according to an eleventh embodiment, wherein (a) is a schematic cross-sectional view that corresponds with FIGS. 19(a), and (b) is a schematic cross-sectional view (enlarged view) that corresponds with FIG. 19(b).

Those members using the same symbols as the above embodiments are deemed to have the same configuration, and description of those members is omitted.

Further, even descriptions of members having a different symbol from the above embodiments may sometimes be omitted if the function of the member is the same.

The point of difference of the protective element according to the eleventh embodiment compared with the protective element according to the ninth embodiment is that the two end surfaces of the fuse element that are connected to the first electrode and the second electrode are both positioned inside the opening of the recessed portion when viewed in a plan view from the first direction.

The protective element 1300 illustrated in FIG. 21 includes a first electrode 1 and a second electrode 2, a fuse element 23 connected by a solder at both end surfaces 23aA and 23bB to the first electrode 1 and the second electrode 2 respectively, a protruding member 11 and a recessed member 20 that are positioned opposing one another so as to sandwich the fuse element 23, and a pressing device 30 that imparts an elastic force that shortens the relative distance in a first direction (the z direction) that represents the direction in which the protruding member 11 and the recessed member 20 sandwich the fuse element 23, wherein one pair of opposing surfaces of a protruding portion 11a of the protruding member 11 and a recessed portion 20a of the recessed member 20 that intersect the direction of current flow through the fuse element 23 (namely, the outside surface 11aBa and the inside surface 20aBa) are positioned close to one another when viewed in a plan view from the first direction (the z direction), the end surfaces 23aA and 23bB of the fuse element 23 that are connected to the first electrode 1 and the second electrode 2 respectively are positioned inside the opening of the recessed portion 20 when viewed in a plan view from the first direction (the z direction), and at least one of the connections between the two end surfaces 23aA and 23bB of the fuse element 23 and the first electrode 1 and the second electrode 2 is cut at a temperature equal to or higher than the softening temperature of the metal material that constitutes the solder.

Twelfth Embodiment

Figure 22:
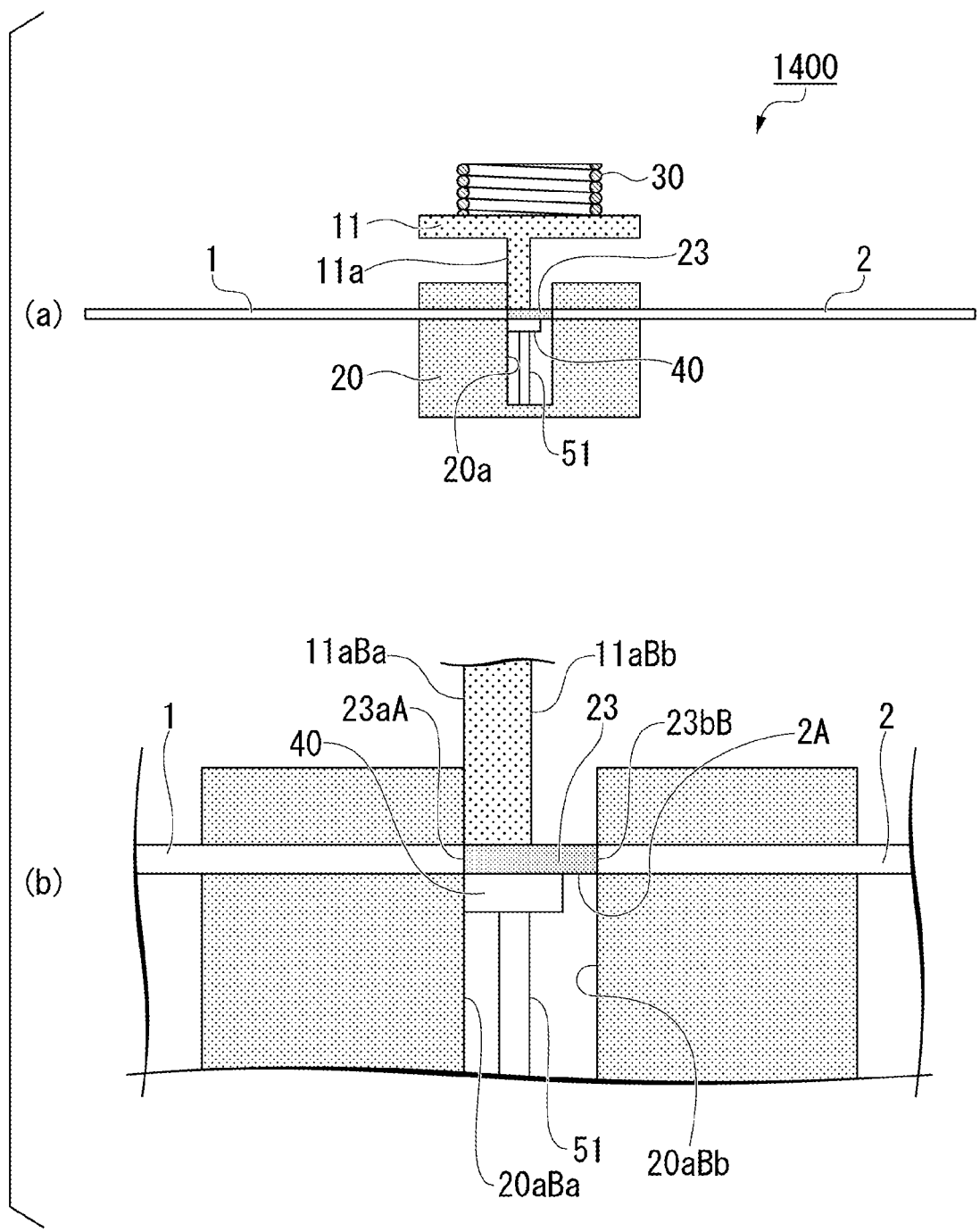
FIG. 22 is a series of schematic views of the main components of a protective element according to a twelfth embodiment, wherein (a) is a schematic cross-sectional view that corresponds with FIGS. 21(a), and (b) is a schematic cross-sectional view that corresponds with FIG. 21(b).

FIG. 22 is a series of schematic views of the main components of a protective element according to a twelfth embodiment, wherein (a) is a schematic cross-sectional view that corresponds with FIGS. 21(a), and (b) is a schematic cross-sectional view (enlarged view) that corresponds with FIG. 21(b).

Those members using the same symbols as the above embodiments are deemed to have the same configuration, and description of those members is omitted.

Further, even descriptions of members having a different symbol from the above embodiments may sometimes be omitted if the function of the member is the same.

The point of difference of the protective element according to the twelfth embodiment compared with the protective element according to the eleventh embodiment is the inclusion of a heating element that is connected electrically to the fuse element, and heats and melts the fuse element.

The protective element 1400 illustrated in FIG. 22 includes a first electrode 1 and a second electrode 2, a fuse element 23 connected by a solder at both end surfaces 23aA and 23bB to the first electrode 1 and the second electrode 2 respectively, a protruding member 11 and a recessed member 20 that are positioned opposing one another so as to sandwich the fuse element 23, and a pressing device 30 that imparts an elastic force that shortens the relative distance in a first direction (the z direction) that represents the direction in which the protruding member 11 and the recessed member 20 sandwich the fuse element 23, wherein one pair of opposing surfaces of a protruding portion 11a of the protruding member 11 and a recessed portion 20a of the recessed member 20 that intersect the direction of current flow through the fuse element 23 (namely, the outside surface 11aBa and the inside surface 20aBa) are positioned close to one another when viewed in a plan view from the first direction (the z direction), the end surfaces 23aA and 23bB of the fuse element 23 that are connected to the first electrode 1 and the second electrode 2 respectively are positioned inside the opening of the recessed portion 20 when viewed in a plan view from the first direction (the z direction), a heating element 40 that heats and melts the fuse element 23 is provided in contact with the fuse element 23 in a position near the protruding portion 10, and at least one of the connections between the two end surfaces 23aA and 23bB of the fuse element 23 and the first electrode 1 and the second electrode 2 is cut by heating the heating element 40.

The protective element 1400 illustrated in FIG. 22 also includes a support member 51, which is positioned inside the recessed portion 20a of the recessed member 20, supports the fuse element 23 directly from beneath, suppresses deformation of the fuse element 23 at temperatures no higher than the temperature during rated current flow through the fuse element 23, but deforms under the force of the pressing device 30 and allows cutting of the fuse element 23 at temperatures equal to or higher than the solidus temperature of the material that constitutes the fuse element 23. Including the support member 51 is able to reduce the shearing load on the fuse element 23 at temperatures no higher than the temperature during rated current flow through the fuse element 23.

The point of difference of the protective element 1400 illustrated in FIG. 22 compared with the protective element 1100 illustrated in FIG. 21 is that the support member 51 supports the fuse element 23 from beneath indirectly with the heating element 40 disposed therebetween.

DESCRIPTION OF THE REFERENCE SIGNS

1: First electrode
2: Second electrode
3, 13, 23: Fuse element
3a: First end portion
3b: Second end portion
10, 11: Protruding member
10a, 11a: Protruding portion
10aBa, 10aBb: Outside surface
20: Recessed member
20a: Recessed portion
20aBa, 20aBb: Inside surface
30: Pressing device
40: Heating element
41: Heat-generating body
42: Electrode layer
50: Support member
60: Case
100, 200, 300, 400, 500, 600, 700, 800, 900, 1000, 1100, 1200, 1300, 1400: Protective element

The invention claimed is:

1. A protective element comprising:
a fuse element having a first end portion and a second end portion, in which current flows from the first end portion toward the second end portion,
a protruding member and a recessed member that are positioned opposing one another so as to sandwich a cutoff portion of the fuse element positioned between the first end portion and the second end portion, and
a pressing device that imparts an elastic force that shortens a relative distance in a first direction that represents a direction in which the protruding member and the recessed member sandwich the cutoff portion, wherein
at least one pair of opposing surfaces of a protruding portion of the protruding member and a recessed portion of the recessed member that intersect a direction of current flow through the fuse element are positioned close to one another when viewed in a plan view from the first direction, and the fuse element is cut at a temperature equal to or higher than a softening temperature of a material that constitutes the fuse element.

2. The protective element according to claim 1, wherein the fuse element is formed from one or a plurality of plate-like or wire-like parts.

3. The protective element according to claim 1, wherein a first terminal member is connected to the first end portion, and a second terminal member is connected to the second end portion.

4. The protective element according to claim 1,
further having a first electrode and a second electrode, wherein
the first electrode is connected to the first end portion of the fuse element and the second electrode is connected to the second end portion of the fuse element.

5. The protective element according to claim 1, wherein the pressing device is a spring or a rubber.

6. The protective element according to claim 1, wherein the recessed member is provided with a guide that guides the protruding portion into the recessed portion.

7. The protective element according to claim 1, further comprising a heating element, in a position near the protruding portion, that contacts the fuse element and heats the fuse element.

8. The protective element according to claim 7, wherein the heating element comprises a heat-generating body, and further comprises an electrode layer electrically connected to the heat-generating body on a surface of the heating element on a fuse element side.

9. The protective element according to claim 8,
further having a third electrode, wherein
one end of the heat-generating body is connected electrically to the electrode layer, and another end of the heat-generating body is connected electrically to the third electrode.

10. The protective element according to claim 8, wherein the heat-generating body is positioned on the fuse element on a side of the protruding member.

11. The protective element according to claim 8, wherein the heat-generating body is positioned on the fuse element on a side of the recessed member.

12. The protective element according to claim 7, wherein side surfaces of the heating element, outside surfaces of the protruding portion, and inside surfaces of the recessed portion are electrically insulated.

13. The protective element according to claim 1, wherein the fuse element is a laminated body having an inner layer composed of a low-melting point metal and an outer layer composed of a high-melting point metal.

14. The protective element according to claim 13, wherein the low-melting point metal is composed of Sn or a metal containing Sn as a main component, and the high-melting point metal is composed of Ag or Cu, or a metal containing Ag or Cu as a main component.

15. The protective element according to claim 1, wherein in a state where a current exceeding a rated current flows through the fuse element, or state where a current is passed through the heat-generating body, the fuse element is heated to a temperature equal to or higher than the softening temperature, and the fuse element is cut, thereby cutting off current flow.

16. The protective element according to claim 1, further comprising a support member, which is positioned inside the recessed portion of the recessed member, supports the fuse element from beneath either directly or indirectly, and is formed from a material that suppresses deformation of the fuse element at temperatures no higher than a temperature during rated current flow through the fuse element, but deforms under a force of the pressing device and allows cutting of the fuse element at temperatures equal to or higher than a solidus temperature of a material that constitutes the fuse element.

17. A protective element comprising:
a fuse element having a first end portion and a second end portion, in which current flows from the first end portion toward the second end portion,
a protruding member and a recessed member that are positioned opposing one another so as to sandwich a cutoff portion of the fuse element positioned between the first end portion and the second end portion, and
a pressing device that imparts an elastic force that shortens a relative distance in a first direction that represents a direction in which the protruding member and the recessed member sandwich the cutoff portion, wherein
at least one pair of opposing surfaces of a protruding portion of the protruding member and a recessed portion of the recessed member that intersect a direction of current flow through the fuse element are positioned close to one another when viewed in a plan view from the first direction,
a heating element that heats and melts the fuse element is provided in contact with the fuse element in a position near the protruding portion, and
the fuse element is cut by heating the heating element.

18. The protective element according to claim 17, wherein the fuse element is formed from one or a plurality of plate-like or wire-like parts.

19. The protective element according to claim 17,
further having a first electrode and a second electrode, wherein
the first electrode is connected to the first end portion of the fuse element and the second electrode is connected to the second end portion of the fuse element.

20. The protective element according to claim 17, wherein the pressing device is a spring or a rubber.

21. The protective element according to claim 17, wherein the recessed member is provided with a guide that guides the protruding portion into the recessed portion.

22. The protective element according to claim 17, wherein the heating element comprises a heat-generating body, and further comprises an electrode layer electrically connected to the heat-generating body on a surface of the heating element on a fuse element side.

23. The protective element according to claim 22,
further having a third electrode, wherein
one end of the heat-generating body is connected electrically to the electrode layer, and another end of the heat-generating body is connected electrically to the third electrode.

24. The protective element according to claim 22, wherein the heat-generating body is positioned on the fuse element on a side of the protruding member.

25. The protective element according to claim 22, wherein the heat-generating body is positioned on the fuse element on a side of the recessed member.

26. The protective element according to claim 17, wherein side surfaces of the heating element, outside surfaces of the protruding portion, and inside surfaces of the recessed portion are electrically insulated.

27. The protective element according to claim 17, wherein the fuse element is a laminated body having an inner layer composed of a low-melting point metal and an outer layer composed of a high-melting point metal.

28. The protective element according to claim 27, wherein the low-melting point metal is composed of Sn or a metal containing Sn as a main component, and the high-melting point metal is composed of Ag or Cu, or a metal containing Ag or Cu as a main component.

29. The protective element according to claim 17, further comprising a support member, which is positioned inside the recessed portion of the recessed member, supports the fuse element from beneath either directly or indirectly, and is formed from a material that suppresses deformation of the fuse element at temperatures no higher than a temperature during rated current flow through the fuse element, but deforms under a force of the pressing device and allows cutting of the fuse element at temperatures equal to or higher than a solidus temperature of a metal material that constitutes the fuse element.

30. A protective element comprising:
a first electrode and a second electrode,
a fuse element connected by a solder at both end surfaces to the first electrode and the second electrode respectively,
a protruding member and a recessed member that are positioned opposing one another so as to sandwich the fuse element, and
a pressing device that imparts an elastic force that shortens a relative distance in a first direction that represents a direction in which the protruding member and the recessed member sandwich the fuse element, wherein
at least one pair of opposing surfaces of a protruding portion of the protruding member and a recessed portion of the recessed member that intersect a direction of current flow through the fuse element are positioned close to one another when viewed in a plan view from the first direction,
one end surface of the fuse element that is connected to either the first electrode or the second electrode is positioned inside an opening of the recessed portion when viewed in a plan view from the first direction, and
a connection between the one end surface and the first electrode or the second electrode is cut at a temperature equal to or higher than a softening temperature of a metal material that constitutes the solder.

31. A protective element comprising:
a first electrode and a second electrode,
a fuse element connected by a solder at both end surfaces to the first electrode and the second electrode respectively,
a protruding member and a recessed member that are positioned opposing one another so as to sandwich the fuse element, and
a pressing device that imparts an elastic force that shortens a relative distance in a first direction that represents a direction in which the protruding member and the recessed member sandwich the fuse element, wherein
at least one pair of opposing surfaces of a protruding portion of the protruding member and a recessed portion of the recessed member that intersect a direction of current flow through the fuse element are positioned close to one another when viewed in a plan view from the first direction,
one end surface of the fuse element that is connected to either the first electrode or the second electrode is positioned inside an opening of the recessed portion when viewed in a plan view from the first direction,
a heating element that heats and melts the fuse element is provided in contact with the fuse element in a position near the protruding portion, and
a connection between the one end surface and the first electrode or the second electrode is cut by heating the heating element.

32. A protective element comprising:
a first electrode and a second electrode,
a fuse element connected by a solder at both end surfaces to the first electrode and the second electrode respectively,
a protruding member and a recessed member that are positioned opposing one another so as to sandwich the fuse element, and
a pressing device that imparts an elastic force that shortens a relative distance in a first direction that represents a direction in which the protruding member and the recessed member sandwich the fuse element, wherein
at least one pair of opposing surfaces of a protruding portion of the protruding member and a recessed portion of the recessed member that intersect a direction of current flow through the fuse element are positioned close to one another when viewed in a plan view from the first direction,
both end surfaces of the fuse element that are connected to the first electrode and the second electrode are positioned inside an opening of the recessed portion when viewed in a plan view from the first direction, and
at least one connection between the end surfaces of the fuse element and the first electrode or the second electrode is cut at a temperature equal to or higher than a softening temperature of a metal material that constitutes the solder.

33. A protective element comprising:
a first electrode and a second electrode,
a fuse element connected by a solder at both end surfaces to the first electrode and the second electrode respectively,
a protruding member and a recessed member that are positioned opposing one another so as to sandwich the fuse element, and
a pressing device that imparts an elastic force that shortens a relative distance in a first direction that represents a direction in which the protruding member and the recessed member sandwich the fuse element, wherein
at least one pair of opposing surfaces of a protruding portion of the protruding member and a recessed portion of the recessed member that intersect a direction of current flow through the fuse element are positioned close to one another when viewed in a plan view from the first direction,
both end surfaces of the fuse element that are connected to the first electrode and the second electrode are positioned inside an opening of the recessed portion when viewed in a plan view from the first direction,
a heating element that heats and melts the fuse element is provided in contact with the fuse element in a position near the protruding portion, and
at least one connection between the end surfaces of the fuse element and the first electrode or the second electrode is cut by heating the heating element.

* * * * *